United States Patent
Bates et al.

(10) Patent No.: US 9,459,850 B2
(45) Date of Patent: *Oct. 4, 2016

(54) ADAPTIVE CLOUD AWARE JUST-IN-TIME (JIT) COMPILATION

(71) Applicant: International Business Machines Corporation, Armonk, NY (US)

(72) Inventors: Cary L. Bates, Rochester, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,139

(22) Filed: Jun. 16, 2014

(65) Prior Publication Data

US 2015/0205587 A1 Jul. 23, 2015

Related U.S. Application Data

(63) Continuation of application No. 14/157,732, filed on Jan. 17, 2014.

(51) Int. Cl.
*G06F 9/45* (2006.01)
*G06F 9/455* (2006.01)
*G06F 9/44* (2006.01)

(52) U.S. Cl.
CPC .............. *G06F 8/443* (2013.01); *G06F 8/48* (2013.01); *G06F 9/4552* (2013.01); *G06F 8/41* (2013.01); *G06F 8/71* (2013.01); *G06F 9/45516* (2013.01)

(58) Field of Classification Search
None
See application file for complete search history.

(56) References Cited

U.S. PATENT DOCUMENTS

| 8,276,140 | B1 | 9/2012 | Beda et al. |
| 2003/0225917 | A1 | 12/2003 | Partamian et al. |
| 2004/0015647 | A1* | 1/2004 | Dmitriev ........................... 711/6 |
| 2004/0054992 | A1 | 3/2004 | Nair et al. |
| 2007/0240135 | A1 | 10/2007 | Stoodley et al. |
| 2010/0138829 | A1* | 6/2010 | Hanquez et al. ................. 718/1 |
| 2011/0088022 | A1 | 4/2011 | Kruglick |
| 2013/0080760 | A1* | 3/2013 | Li et al. ........................ 713/100 |

FOREIGN PATENT DOCUMENTS

WO    WO2012040742    3/2012

OTHER PUBLICATIONS

IBM Corp., "IBM SmartCloud Entry User's Guide," Version 2.4 (3rd Edition, Oct. 2012).
Oracle Corp, "The Java HotSpot Performance Engine Architecture," published on the world wide web at http://www.oracle.com/technetwork/java/whitepaper-135217.html, publication date unknown.

* cited by examiner

*Primary Examiner* — Lewis A Bullock, Jr.
*Assistant Examiner* — Tina Huynh
(74) *Attorney, Agent, or Firm* — Roy W. Truelson

(57) ABSTRACT

Clients accessing cloud computing services are allocated respective virtual machines, each client specifying defining parameters for its virtual machine(s). A just-in-time compiler executing within a client's virtual machine optimizes the executable code it generates based at least in part, on the defining parameters of the virtual machine. During execution of an application using the just-in-time compiler, the compiler is notified of changes made to the defining parameters of the virtual machine. Responsive to such notification, the just-in-time compiler thereafter optimizes compiled code it generates for execution in the virtual machine as modified.

14 Claims, 11 Drawing Sheets

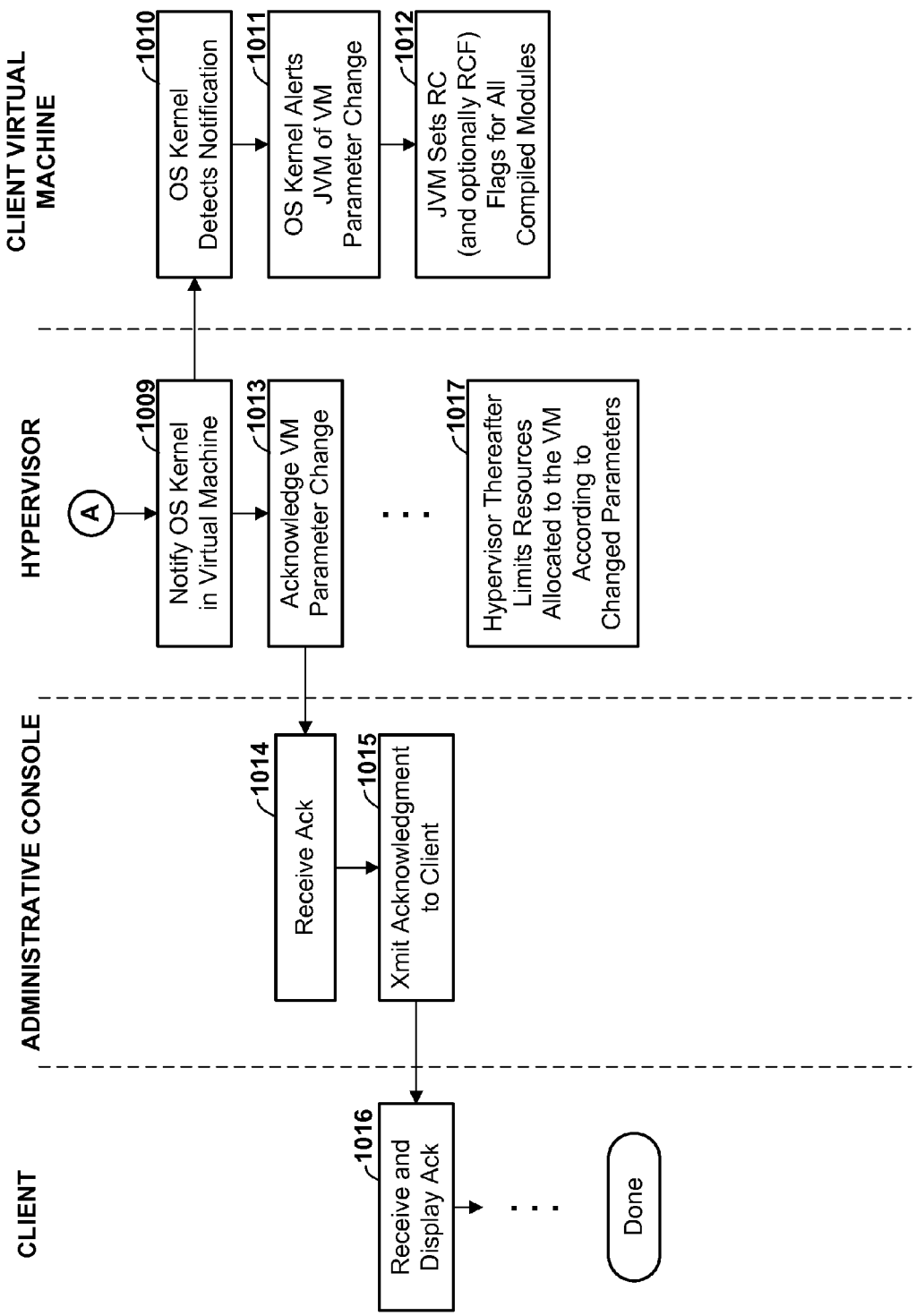

ADAPTIVE CLOUD AWARE JUST-IN-TIME (JIT) COMPILATION

CROSS-REFERENCE TO RELATED APPLICATION

This is a continuation of pending U.S. patent application Ser. No. 14/157,732, filed Jan. 17, 2014, entitled "Adaptive Cloud Aware Just-in-Time (JIT) Compilation", which is herein incorporated by reference. This application claims priority under 35 U.S.C. §120 of U.S. patent application Ser. No. 14/157,732.

FIELD OF THE INVENTION

The present invention relates to digital data processing, and in particular to cloud-based digital data processing environment providing a virtual just-in-time compiler.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users. At the same time, the cost of computing resources has consistently declined, so that information which was too expensive to gather, store and process a few years ago, is no economically feasible to manipulate via computer. The reduced cost of information processing drives increasing productivity in a snowballing effect, because product designs, manufacturing processes, resource scheduling, administrative chores, and many other tasks, are made more efficient.

Early computer systems were isolated machines, in which data was input manually or from storage media and output generated to storage media or human perceptible form. While useful in their day, these systems were extremely limited in their ability to access and share information. As computers became more capable, and the ability to store vast amounts of digital data became prevalent, the desirability of communicating with other computer systems and sharing information became manifest. This demand for sharing information led to a growth of computer networks, including the Internet. It is now rare to find a general purpose computer system having no access to a network for communicating with other computer systems, although many special-purpose digital devices still operate in isolated environments.

More recently, this evolution of isolated computers to networked devices and shared information has proceeded to a further stage in digital data processing: the cloud. The "cloud" is in fact a collection of computing hardware and software resources which are accessible from remote locations to perform useful work on behalf of a client. However, except for the access point, such as a client computer terminal having limited capability, the client does not own or control hardware and software resources which provide computing services in the cloud. The cloud presents a virtualized system having the capability to provide whatever computing services are required. The client contracts to obtain the computing services. These services are provided by the virtualized system, i.e., without any specification of the particular physical computer systems which will provide the contracted service. This virtualization enables a provider of services in the cloud to re-allocate the physical computer resources as convenient, without involvement of the client. Cloud computing has thus been analogized to an electric utility, in which the customer purchases electric power without any knowledge or concern how the power is generated. Cloud computing not merely enables communications with other computing devices and access to remotely stored data, but enables the entire computing task to be performed remotely.

Although some of the concepts used in cloud computing date back to the 1950's and early time sharing systems, the use of cloud computing in a global networked environment is a relatively new phenomenon, and deployment of cloud computing on a broad scale is still in its early stages. New challenges arise as designers attempt to implement the broad concepts of cloud computing in functioning systems.

In both traditional and cloud computing systems, computer programs instruct the system to perform useful work. Programs are generally written in a high-level language. High-level languages vary in their characteristics, but all such languages are intended to make it easier for a human to write a program to perform some task. Typically, high-level languages represent operations, fixed values, variables, and other constructs in a manner readily understandable to the human programmer rather than the computer. Such programs are not directly executable by a computer's processor. In order to run on the computer, the programs must first be transformed from a human-readable form (source code) to something executable by a processor of a computer, i.e. to a set of instructions directly readable and executable by the processor, each comprising a respective sequence of binary bits in a pre-defined format, each bit position being specific to logic within a computer's processor which reads and decodes it. The bit sequence formatting and the meaning of the bit combinations defines the "instruction set" of the processor.

In general, source code is universal and understandable by anyone trained to use the applicable language, while executable code is specific to a particular computer system environment, and can only execute on that computer system or one similarly configured. In particular, the executable code is specific to the processor's instruction set, although it may be specific to other parameters of the computer system as well.

Various techniques exist for transforming the source code in a high-level language to processor-executable instructions in the processor's instruction set. Source code can be "interpreted", meaning that a special program (an "interpreter") takes each source code statement in sequence, and executes a small procedure (i.e., series of instructions in the processor-executable instruction set) corresponding to each source code instruction. Interpreting is useful for some purposes, but it is generally rather inefficient.

Traditionally, for greater execution efficiency, individual portions (modules) of source code are compiled to form modules of processor-executable instructions, which may be linked together to form larger programs (although some programs contain only a single compiled module). These programs are saved in digital media storage in executable form, and may be distributed in that form to other computer systems, or remain on the system in which they were first compiled. In this form they are later executed, usually many times. Compilation is itself a task performed by a special computer program (a compiler), and can take significant time. Often, compilation involves certain optimizations to the executable code which require analysis of the various instruction sequences within the program. Unlike interpreted code, the resultant processor-executable instructions in a compiled module do not necessarily correspond to particular source instructions, and do not necessarily follow the same sequence, although they must produce the same logical output. Since it is expected that such programs will be executed many times, the burden of compilation is spread over many executions. This traditional form of compilation is sometimes referred to as "static compilation".

In recent years, there has been increasing interest in "just-in-time" dynamic compilation or optimization. Like static compilation, "just-in-time" or dynamic compilation/optimization involves the generation of optimized processor-executable instructions. But unlike static compilation, the program's processor-executable instructions are generated at the time of execution of the program of which the processor-executable instructions are a part (the "target program"). This effectively means that just-in-time or dynamic compilation/optimization is intended to be performed many times, for example, each time the program is executed, or for each user process which executes the program.

Obviously, when compared with traditional static compilation, dynamic compilation/optimization suffers from the drawback that it is performed again each time the program is executed or for each new user process. However, there are various advantages to just-in-time or dynamic compilation/optimization that make it attractive in many circumstances. For example, dynamically compiled code is generated on the system that will execute it, and can be generated from a universal, intermediate level code form (between a high-level source language and a processor-executable form), which facilitates portability of the program. Such an approach is frequently used in the well-known JAVA™ virtual machine environment. Furthermore, additional knowledge available to the system at execution time, such as the exact system configuration, the code modules being used, and the actual pattern of code execution, may make it possible to generate more efficient compiled code than can typically be generated using a static compiler. Such additional knowledge is particularly effective in the case of actual code usage patterns, which allow dynamic compilation/optimization to focus on optimizing specific portions of the code.

The advantage of portability inherent in dynamic compilation makes it particularly useful in many cloud computing environments, because the actual physical machine which will execute a given task is not generally known in advance, and hence the instruction set and other parameters of the processor or processors executing the task are unknown. A dynamic compiler can potentially generate the executable code at a time when the required binary instruction set format is known.

With the growth in cloud computing, it is desirable to adopt the compilation of computer programming code to a cloud environment in an optimal manner, and in particular to provide enhanced techniques for dynamic programming code compilation which take advantage of, and operate efficiently within, the cloud computing environment.

SUMMARY

A cloud computing environment supports execution of application code specified by multiple clients. Each client accessing cloud services is allocated a respective virtual machine, the characteristics of each virtual machine varying in accordance with defining parameters which are, at least in part, specified by the corresponding client. Among the services supported by the cloud computing environment is a just-in-time compiler executable in each of at least some of the virtual machines. Each instance of the just-in-time compiler executing within a virtual machine optimizes the executable code it generates for use on the virtual machine in which it executes, this optimization being dependent, at least in part, on the defining parameters of the respective virtual machine. During execution of an application using the just-in-time compiler in a virtual machine, the compiler is notified of changes made to the defining parameters of the virtual machine in which it executes. Responsive to such notification, the just-in-time compiler thereafter optimizes compiled code it generates for execution in the modified virtual machine.

By notifying the just-in-time compiler of changes made to the virtual machine's defining parameters and thereafter optimizing just-in-time compiled executable code accordingly, code execution under a just-in-time compiler in a cloud environment is made more efficient and/or conforms more closely to the user specified parameters of the corresponding virtual machine.

The details of the present invention, both as to its structure and operation, can best be understood in reference to the accompanying drawings, in which like reference numerals refer to like parts, and in which:

BRIEF DESCRIPTION OF THE DRAWING

FIGS. 10A and 10B (herein collectively referred to as FIG. 10) are a flow diagram illustrating at a high level the process of changing the defining parameters of a client's virtual machine executing in the cloud, according to the preferred embodiment.

DETAILED DESCRIPTION

Cloud Computing Overview

In accordance with one or more preferred embodiments of the present invention, certain improvements are made to computer program efficiency in a cloud computing environment, and particularly to the efficiency of programs using Just-In-Time (JIT) compilation in a cloud computing environment.

Cloud computing involves the use of on-demand computing resources which are accessed remotely, i.e., over a network, by a client digital computing device. The client does not request the use of specific computing devices, but requests computing services defined in some standardized form. For example, the client may request some processor capacity and/or memory capacity, using standardized measures of processor and/or memory. Alternatively, the client may request that particular application programs be executed and/or that particular input data be processed, the amount of processor and/or memory capacity being assumed or derived according to the application and data processing service requested. The request may specify, implicitly or explicitly, a response time, schedule or other parameters with respect to when the requested work is performed or resources are provided. The amount of computing resource requested by the client may change from time to time.

The cloud includes a collection of hardware and software computing resources accessible through one or more networks. In general, these resources are sufficient to meet changing demands from multiple clients. The cloud has therefore been analogized to an electric utility, which provides electric power on demand to multiple customers. Customers do not request that electric power be generated by specific generation equipment or transmitted over specific lines, and in general customers have no way of knowing which specific generation and transmission equipment is used. By the same token, a cloud provides computing services to its clients on demand, without the client specifying or knowing which particular digital computing devices are providing the requested service.

Figure 1:
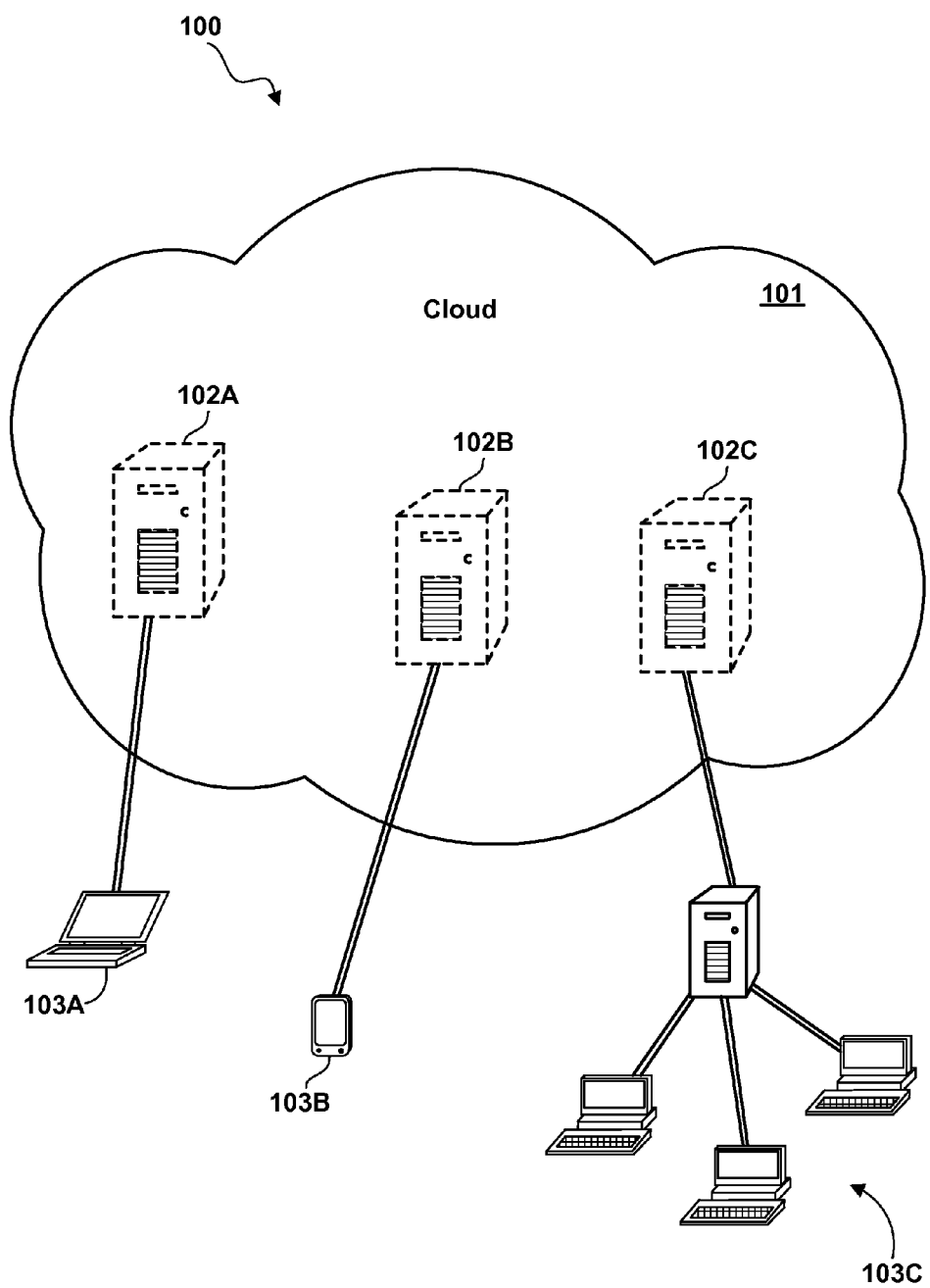
FIG. 1 is a high-level conceptual representation of a cloud computing environment from the perspective of clients who utilize cloud resources, according to one or more preferred embodiments of the present invention.

Referring to the Drawing, wherein like numbers denote like parts throughout the several views, FIG. 1 is a high-level conceptual representation of a cloud computing environment 100 from the perspective of clients who utilize cloud resources, according to one or more preferred embodiments of the present invention. Multiple clients 103A, 103B, 103C (herein generically referred to as feature 103) access respective computing services in the cloud 101. A client could be any digital data device capable of communicating with the cloud over a network. For example, FIG. 1 represents a laptop computer system 103A, a handheld portable device 103B such as a personal digital assistant, smartphone, or the like, and a multi-user computer system 103C having multiple terminals attached thereto. However, it will be understood that these examples are not exhaustive, and any of various alternative digital data devices could be used, that such devices might be single user or multiple user, might be general-purpose programmable digital computers or special purpose digital devices, could have fixed location or movable location (including vehicular mounted devices), and so forth.

From the perspective of the client, each client device 103A, 103B, 103C obtains computing services in the cloud 101 from a respective virtual server system 102A, 102B, 102C (herein generically referred to as feature 102). Each virtual server system 102 appears to the client as a computer system having the hardware and software resources requested (either explicitly or implicitly) by the client to perform computing services on behalf of the client. Since each client is free to request services independently of any other client, each virtual server system 102 does not necessarily include, and in general will not include, identical hardware and software resources and will not be configured in an identical manner.

Figure 2:
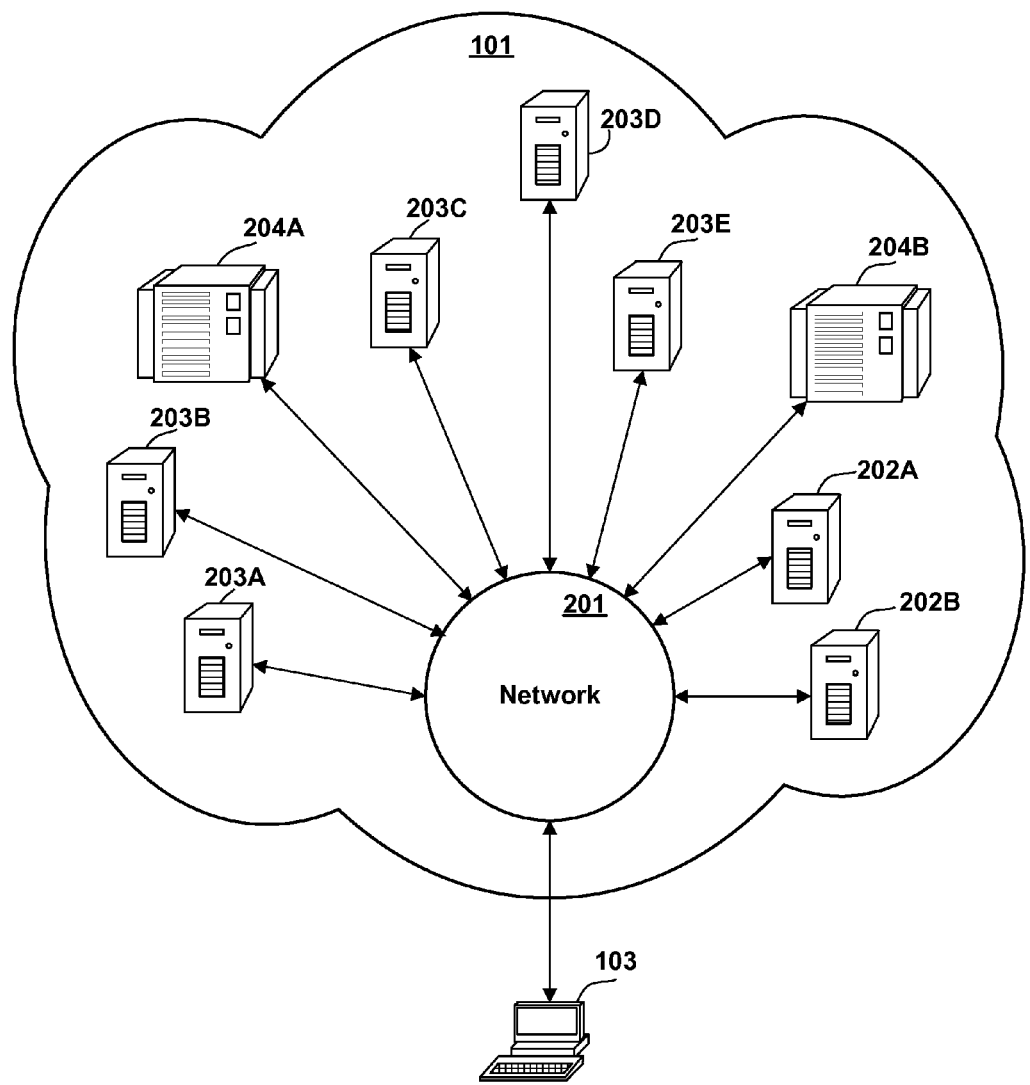
FIG. 2 is a high-level illustration of the representative major physical components which implement a cloud computing environment, in accordance with one or more preferred embodiments.

FIG. 2 is a high-level illustration of the representative major physical components which implement a cloud computing environment, in accordance with one or more preferred embodiments. As shown in FIG. 2, the cloud 101 is implemented by a collection of physical devices including a network 201 (which may in fact be configured as a collection of networks capable of communicating data among themselves), to which are coupled multiple digital data devices, as well as multiple clients (of which only one representative client 103 is illustrated in FIG. 2). The multiple digital devices preferably include one or more portal servers 202A, 202B (herein generically referred to as feature 202) and multiple application servers 203A-203E (herein generically referred to as feature 203). Portal server(s) 202 and application servers 203 are preferably general purpose digital computers, each having a respective at least one programmable central processing unit (CPU) which executes instructions storable in an addressable memory. Digital devices may further include one or more storage servers 204A-204B (herein generically referred to as feature 204) which function as shared data storage available to application servers 203. The cloud computing environment 101 may further include additional devices (not shown), such as routers and special purpose digital devices for performing accounting, maintenance, backup, and other functions.

A client 103 requesting cloud computing services initially accesses a portal server 202, which assigns the work to one of application servers 203 based on the parameters of the client's request. Each application server 203 is capable of concurrently supporting multiple virtual machines, each on behalf of a respective client, to perform useful work requested by the respective client. Certain applications requested by a client may require the corresponding application server 203 to access data stored in one of storage servers 204. The selected server provides a virtual machine as requested by the client and performs the work required. Generally, the client does not select a particular machine, and from the client's perspective the cloud simply provides a virtual machine having the requested parameters (although it is possible in some cloud environments to give the client the option of selecting a particular machine).

In the preferred embodiment, network 201 is or includes the Internet, and may further include other networks, such as one or more local area networks, which are coupled to the Internet and capable of communicating therewith, as is well known in the art. Additionally, in an embodiment, may include one or more virtual networks (VLANs). In particular, client 103 preferably accesses the cloud 101 via the Internet, although the various servers 202, 203, 204 which support cloud computing may be configured as one or more local area networks or VLANs in communication with the Internet. However, a cloud computing environment would not necessarily have to include the Internet, and might include some other network or networks, such as an internal network of a large business entity.

Although FIGS. 1 and 2 represent in simplified form a particular number of clients 103, virtual machines 102, portal servers 202, applications servers 203 and storage servers 204, it will be appreciated that the number of such device could vary and is typically much larger. It will further be understood that, although various devices may appear identical for representational purposes in the figures, they do not necessarily have identical attributes. It will be further understood that the topology of network 201 is represented in simplified form for clarity of illustration, and that the actual topology of network communications may be far more complex, and may involve redundant networks and links, hierarchical network connections and/or any of various network configurations known in the art.

Portal server 202 is preferably a server computer system which maintains a web site on the world wide web in the form of one or more web pages, accessible through a uniform resource locator (URL) passed by a web browser program executed on a client 103 requesting service. A client accesses cloud computing services through the portal server, which allocates resources from among the application servers to service the client. Providing access via a web browser interface has the advantage of an interface which typically requires no special hardware or software within the client device, since, as is well known, most modern personal computers, tablets, smart phones, and the like, are already equipped with a web browser interface. Although preferably available on the world wide web, portal server 202 could alternatively be only available within an internal company information technology network. Although portal server is preferably accessed from a client's browser using a web-based protocol, it would alternatively be possible to access a portal server or other device performing an analogous function using some other protocol, which may require special-purpose software and/or hardware within the client device. The cloud computing environment may include only a single portal server 202, but preferably includes multiple servers 202 which collectively support the same URL and share the task of servicing clients requesting use of cloud computing facilities through that URL. Multiple servers 202 provide redundancy and continuous operation in the event that any one server 202 malfunctions. The use of such multiple servers to support a continuously operational, redundant web site is well known in the art. In an additional alternative embodiment, there are no dedicated portal servers 202, but the functions described herein as performed by a portal server are instead performed by one or more of application servers 203, which function as both application servers and portal servers. In the present Specification, portal server 202 will be described as a single server apart from the application servers 203, for simplicity and clarity of description, it being understood that the hardware and software components of portal server 202 and their operation described herein are preferably embodied in and performed by multiple physical computer systems which support the same web site accessed by the same URL.

Figure 3:
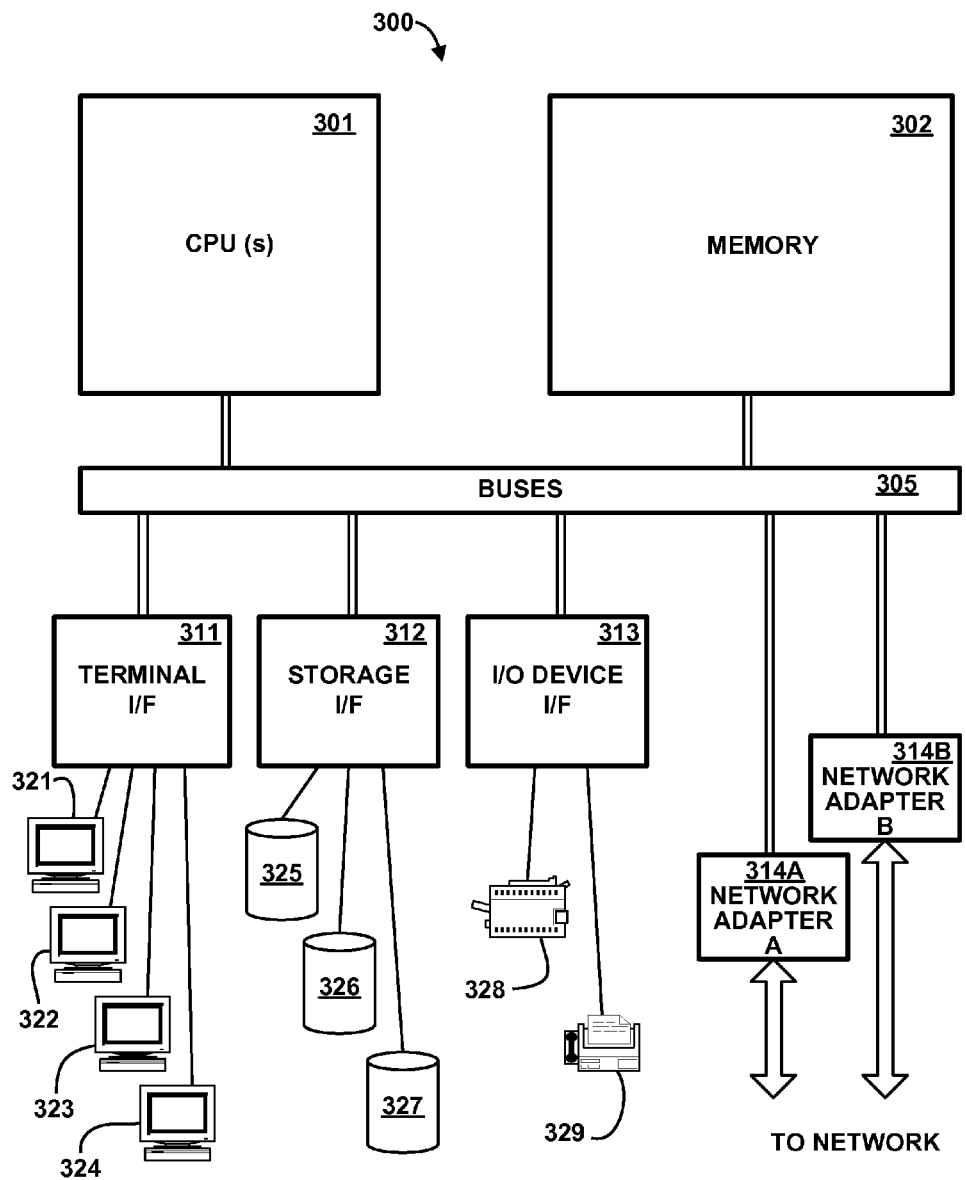
FIG. 3 is a high-level block diagram of the major hardware components of a representative general purpose computer system which could be used to perform the role of any of several functional elements, according to the preferred embodiment.

FIG. 3 is a high-level block diagram of the major hardware components of a representative general purpose computer system 300. In the preferred embodiment, portal server(s) 202 and application servers 203 are physically embodied as respective one or more general purpose computer systems, system 300 being a representation of any such general purpose computer system. Client 103 may also be embodied as a general purpose computer system.

Computer system 300 includes at least one general-purpose programmable processor (CPU) 301 which executes instructions and processes data from main memory 302. Main memory 302 is preferably a random access memory using any of various memory technologies, in which data is loaded from storage or otherwise for processing by CPU 301.

One or more communications buses 305 provide a data communication path for transferring data among CPU 301, main memory 302 and various I/O interface units 311, 312, 313, 314A, 314B, which may also be known as I/O processors (IOPs) or I/O adapters (IOAs). The I/O interface units support communication with a variety of storage and I/O devices. For example, terminal interface unit 311 supports the attachment of one or more user terminals 321-324. Storage interface unit 312 supports the attachment of one or more direct access storage devices (DASD) 325-327 (which are typically rotating magnetic disk drive storage devices, although they could alternatively be other devices, including arrays of disk drives configured to appear as a single large storage device to a host). I/O device interface unit 313 supports the attachment of any of various other types of I/O devices, such as printer 328 and fax machine 329, it being understood that other or additional types of I/O devices could be used. Network interface adapters 314A, 314B (herein generically referred to as feature 314) support connections to one or more external networks for communication with one or more other digital devices, and specifically to network 201 for communication with devices represented in FIG. 2. Network adapters 314 could support redundant connections to a single network, or could be coupled to separate networks, which may or may not be in communication with each other. While two network adapters 314 and network connections are shown, there may be only a single adapter and connection, or there could be more than two. Such external networks preferably include the Internet, and may include one or more intermediate networks, such as local area networks (not shown), through which communication with the Internet is effected.

It should be understood that FIG. 3 is intended to depict the representative major components of general purpose computer system 300 at a high level, that individual components may have greater complexity than represented in FIG. 3, that components other than or in addition to those shown in FIG. 3 may be present, that the number, type and configuration of such components may vary, and that a complex computer system will typically have more components than represented in FIG. 3. Several particular examples of such additional complexity or additional variations are disclosed herein, it being understood that these are by way of example only and are not necessarily the only such variations.

Although only a single CPU 301 is shown for illustrative purposes in FIG. 3, computer system 300 may contain multiple CPUs, as is known in the art. Although main memory 302 is shown in FIG. 3 as a single monolithic entity, memory 302 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 305 are shown in FIG. 3 as a single entity, in fact communications among various system components is typically accomplished through a complex hierarchy of buses, interfaces, and so forth, in which higher-speed paths are used for communications between CPU 301 and memory 302, and lower speed paths are used for communications with I/O interface units 311-314. Buses 305 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 305 from various communications paths running to the various I/O devices, it would alternatively be possible to connect some or all of the I/O devices directly to one or more system buses.

Computer system 300 depicted in FIG. 3 has multiple attached terminals 321-324, such as might be typical of a multi-user "mainframe" computer system. Typically, in such a case the actual number of attached devices is greater than those shown in FIG. 3, although the present invention is not limited to systems of any particular size. Where computer system 300 is used exclusively as portal server 202 or application server 203 for performing work on behalf of remote clients 103, it may contain only a limited number of terminals, or even a single terminal, e.g., for use as a maintenance interface by a system administrator or the like, or in some cases no terminal at all, administrative functions being performed remotely. Furthermore, while certain functions are described herein for illustrative purposes as embodied in a single computer system, some or all of these functions could alternatively be implemented using a distributed network of computer systems in communication with one another, in which different functions or steps described herein are performed on different computer systems.

In the preferred embodiment, portal server(s) 202, application servers 203, and at least some clients 103, are general purpose computer systems capable of being programmed to execute a variety of different functions by loading and executing appropriate software. The functions described herein are performed by appropriate executable software modules installed in the corresponding computer systems. However, any of these devices could alternatively be special-purpose digital data devices for accomplishing the corresponding functions. For example, one or more of client devices may be any of various smart phones or portable devices capable of invoking remote computing functions through an on-board browser or limited browser function.

While various system components have been described and shown at a high level, it should be understood that a typical computer system contains many other components not shown, which are not essential to an understanding of the present invention.

In the preferred embodiment, each server system 202, 203 is logically partitionable into a plurality of virtual machines each executing on behalf of a respective client or performing administrative or other functions. Partitioning is a technique for dividing a single large computer system into multiple partitions, each of which behaves in some respects as a separate computer system. Computer system resources may be allocated in any of various ways for use by the virtual machines. A given resource may be allocated for exclusive use by a single particular virtual machine, or may be shared among all virtual machines (or some subgroup of virtual machines) on a time interleaved or other basis. Some resources may be allocated to respective particular virtual machines, while others are shared. Examples of resources which may be partitioned are CPU(s) 301, main memory 302, data storage within storage units 325-327, and network bandwidth. I/O adapters 311-314 are typically shared, although they could be partitioned as well. Each client using cloud services executes its own tasks in the virtual machine partition assigned to the client, meaning that it can use only the system resources or share of resources assigned to that virtual machine, and not resources assigned to other virtual machines. Additionally, some virtual machines may be used for administrative, maintenance, and other functions, in particular the functions of a portal server 202 providing a web interface to cloud services and assigning clients to corresponding servers as described herein.

Virtual machine partitioning of resources is virtual rather than physical. Server systems 202, 203 preferably have physical data connections such as buses running among different hardware components, allowing them to communicate with one another. These hardware resources may be shared by and/or allocated to different virtual machines. From a physical configuration standpoint, there is preferably no distinction made with regard to virtual machine partitions. The system's physical devices and subcomponents thereof are preferably physically connected to allow communication without regard to virtual machine partitions, and from this hardware standpoint, there is nothing which prevents a task executing in virtual machine A from writing to memory or storage allocated to virtual machine B.

Generally, allocation of resources to a virtual machine is enforced by a partition manager embodied as low-level encoded executable instructions and data, although there may be a certain amount of hardware support for virtual machine partitioning, such as special hardware registers which hold state information. The partition manager (and associated hardware, if any) prevent access by a virtual machine to the resources allocated to another virtual machine. Code enforcement of partitioning constraints generally means that it is possible to alter the virtual configuration of a partitioned computer system, i.e., to change the number of virtual machines or re-assign resources to different virtual machines, without reconfiguring hardware. In the preferred embodiment described herein, this low-level logical partitioning code is referred to as the "hypervisor".

Partitioning of a large computer system into multiple virtual machines has several potential advantages. As noted above, it is flexible in that reconfiguration and re-allocation of resources is easily accomplished without changing hardware. It isolates tasks or groups of tasks, helping to prevent any one task or group of tasks from monopolizing system resources. It facilitates the regulation of resources provided to particular users; this is important where the computer system is owned by a service provider which provides computer service to different users on a fee-per-resource-used basis. It may enable a single computer system to concurrently support multiple operating systems and/or environments, since each virtual machine can be executing a different operating system or environment. Finally, isolation of tasks and resources makes it more difficult for a process executing in one virtual machine to access resources in another virtual machine, thus providing greater security and data integrity.

Figure 4:
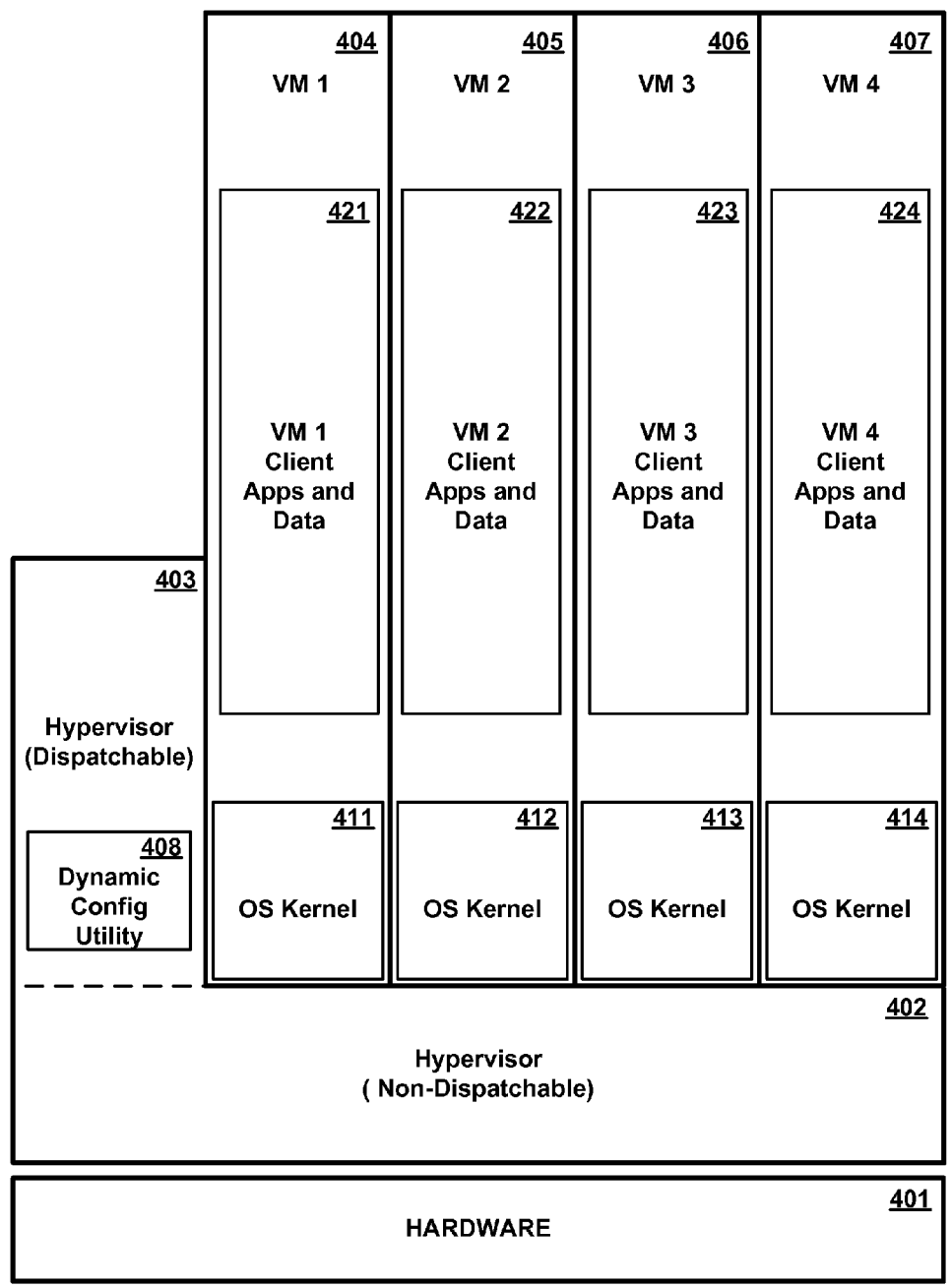
FIG. 4 is a conceptual illustration showing the existence of logical partitions at different hardware and software levels of abstraction in a server systems, according to the preferred embodiment.

FIG. 4 is a conceptual illustration showing the existence of manager code and virtual machine partitions at different hardware and software levels of abstraction in one of server systems 202, 203. FIG. 4 represents a system having four client virtual machines in respective partitions 404-407, each executing one or more applications on behalf of the respective client. These are designated "VM 1", "VM 2", etc., it being understood that the number of virtual machines may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 4, the "higher" levels of abstraction are generally represented toward the top of the figure, while lower levels are represented toward the bottom.

As shown in FIG. 4 and explained earlier, virtual partitioning of machine resources is a code-enforced concept. In general, at the hardware level 401, partition boundaries do not exist (although there may be certain special purpose registers or other hardware used to identify partition boundaries or other virtual machine aspects). As used herein, hardware level 401 represents the collection of physical devices (as opposed to data stored in devices), such as processors, memory, buses, I/O devices, etc., shown in FIG. 3, possibly including other hardware not shown in FIG. 3. As far as a processor 301 is concerned, it is merely executing machine level instructions. While code can direct tasks in certain virtual machines to execute on certain processors, there is nothing in the processor itself which dictates this assignment, and in fact the assignment can be changed by the code. Therefore the hardware level is represented in FIG. 4 as a single entity 401, which does not itself distinguish among virtual machines.

Partition boundaries among the various virtual machines are enforced by a partition manager (also known as a "hypervisor"), consisting of a non-relocatable, non-dispatchable portion 402, and a relocatable, dispatchable portion 403. The hypervisor is super-privileged executable code which is capable of accessing resources, such as processor resources and memory, assigned to any virtual machine. The hypervisor maintains state data in various special purpose hardware registers, and in tables or other structures in general memory, which govern boundaries and behavior of the partitions. Among other things, this state data defines the allocation of resources to virtual machines, and the allocation is altered by changing the state data rather than by physical reconfiguration of hardware.

In the preferred embodiment, the non-dispatchable hypervisor 402 comprises non-relocatable instructions which are executed by CPU 301 just as instructions for tasks executing in the virtual machines. The code is non-relocatable, meaning that the code which constitutes the non-dispatchable hypervisor is at fixed real addresses in memory 302. Non-dispatchable hypervisor 402 has access to the entire real memory address range of system 300, and can manipulate real memory addresses. The dispatchable hypervisor code 403 (as well as all code executing within a virtual machine partition) is contained at addresses which are relative to an address range assigned to the partition in which it executes, and therefore this code is relocatable. The dispatchable hypervisor behaves in much the same manner as a client's virtual machine partition, but it is hidden from the clients and not available to execute user applications. In general, non-dispatchable hypervisor 402 handles assignment of tasks to physical processors, memory mapping and partition enforcement, and similar essential tasks required to execute application code in a partitioned system, while dispatchable hypervisor 403 handles maintenance-oriented tasks, such as creating and altering virtual machine definitions.

As represented in FIG. 4, there is no direct path between higher levels (levels above non-dispatchable hypervisor 402) and hardware level 401. While machine instructions of tasks executing at higher levels can execute directly on a processor core 301, access to hardware resources is controlled by the non-dispatchable hypervisor. Non-dispatchable hypervisor 402 enforces partition boundaries of processor resources. I.e., task dispatchers at a higher level (the respective operating systems) dispatch tasks to virtual processors defined by the virtual machine parameters, and the hypervisor in turn dispatches virtual processors to physical processors at the hardware level 401 for execution of the underlying task. The hypervisor also enforces partitioning of other resources, such as allocations of memory to virtual machines, and routing I/O to I/O devices associated with the proper virtual machine.

Dispatchable hypervisor 403 performs many auxiliary system management functions which are not the province of any client virtual machine. The dispatchable hypervisor generally performs higher level virtual machine management operations such as creating and deleting virtual machine partitions, concurrent hardware maintenance, allocating processors, memory and other hardware resources to various virtual machines, etc. In particular, in the preferred embodiment dispatchable hypervisor 403 includes a dynamic configuration utility 408 which dynamically adjusts system configuration parameters responsive to commands from the administrative console application, i.e. responsive at least in part to client input, as explained in further detail herein.

Above non-dispatchable hypervisor 402 are a plurality of virtual machines 404-407. Each virtual machine behaves, from the perspective of processes executing within it, as an independent computer system, having its own memory space and other resources. Each virtual machine therefore contains a respective operating system kernel herein identified as the "OS kernel" 411-414. At the level of the OS kernel and above, each virtual machine behaves differently, and therefore FIG. 4 represents the OS Kernel as four different entities 411-414 corresponding to the four different virtual machines. In general, each OS kernel 411-414 performs roughly equivalent functions. However, it is not necessarily true that all OS kernels 411-414 are identical copies of one another, and they could be different versions of architecturally equivalent operating systems, or could even be architecturally different operating systems. OS kernels 411-414 perform a variety of task management functions, such as task dispatching, paging, enforcing data integrity and security among multiple tasks, and so forth.

Above the OS kernels in each respective virtual machine there may be any of various applications and data 421-424. In particular, for server systems 203 supporting virtual machines executing on behalf of remote clients 103, these are applications executing on behalf of the respective clients and associated data generated or used by those applications, as further described herein with respect to exemplary FIG. 9. Additionally, these applications could represent an administrative console and associated applications and data, as further described herein with respect to FIG. 5. Although applications and data 421-424 have the same appearance in the conceptual representation of FIG. 4, it will be understood that in general each virtual machine includes different applications and data.

While various details regarding a partitioned system architecture for supporting multiple virtual machines have been described herein as used in the preferred embodiment, it will be understood that many variations in the mechanisms used to enforce and maintain virtual machines are possible consistent with the present invention, and in particular that administrative mechanisms such as a non-dispatchable hypervisor, dispatchable hypervisor, and so forth, may vary in their design, or that some systems may employ some or none of these mechanisms, or that alternative mechanisms for supporting and maintaining multiple virtual machines may be present.

Figure 5:
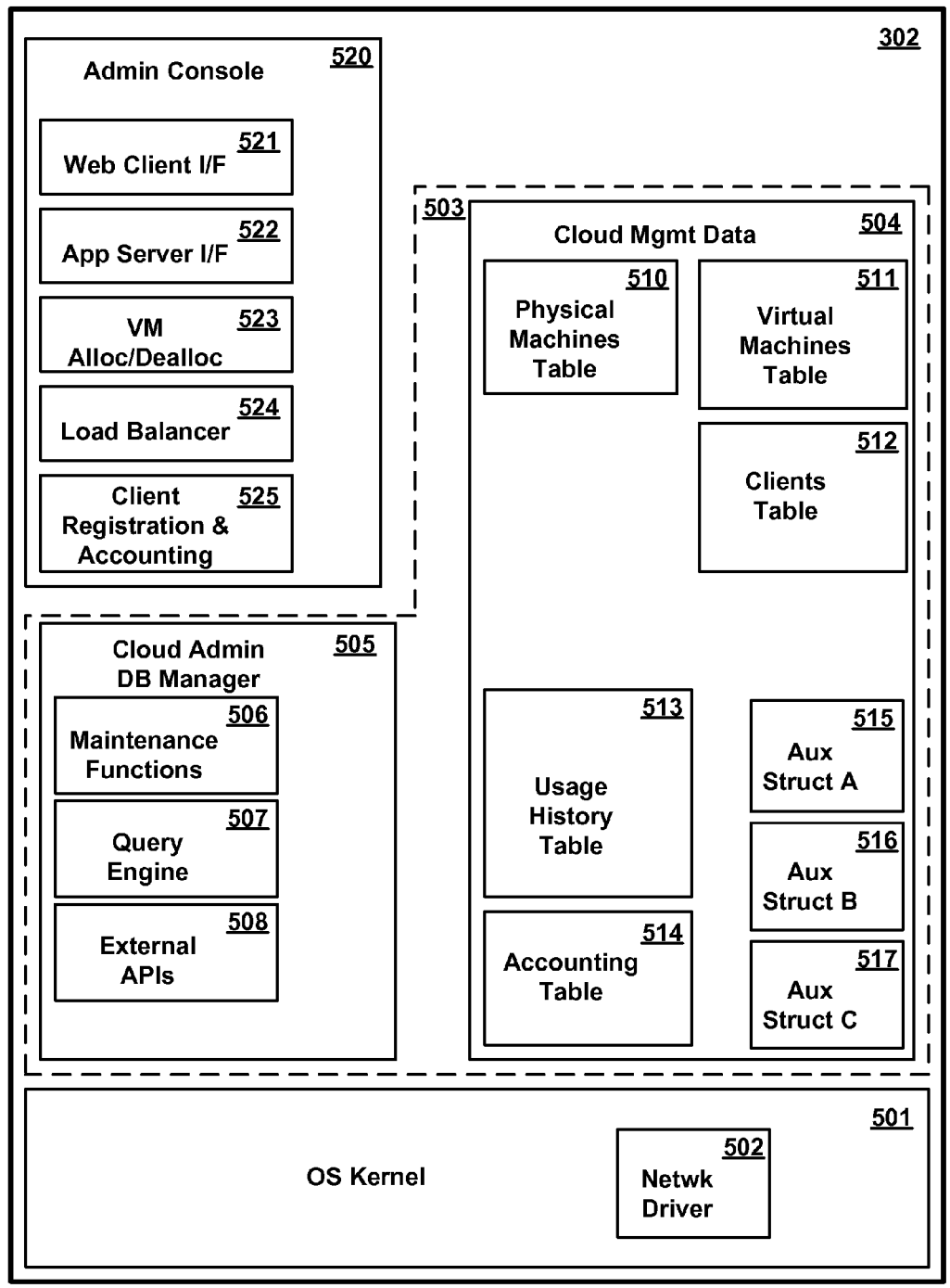
FIG. 5 is a conceptual illustration of the major software components of a computer system of FIG. 3 configured as a portal server, according to the preferred embodiment.

FIG. 5 is a conceptual illustration of the major software components of computer system 300 in memory 302, configured to provide the function of a portal server 202, according to the preferred embodiment. In the preferred embodiment, the software components illustrated in FIG. 5 occupy a single partition (virtual machine) of a physical computer system 300 supporting multiple virtual machines; however, the illustrated components of a portal server could alternatively reside in an unpartitioned, dedicated portal server, or could reside across more than one virtual machine or physical machine. Operating system kernel 501 is executable code and state data providing various low-level software functions, such as device interfaces, management of memory pages, management and dispatching of multiple tasks, etc. as is well-known in the art. In particular, OS kernel 501 includes one or more network adapter drivers 502 for handling communications with network 201 via network adapters 314. Cloud administrative database 503 contains data structures and database management software for managing cloud computing on behalf of multiple clients 103. Additionally, one or more software application programs collectively designated an administrative console application 520 executes various functions and accesses data in database 503 to provide the functions of client interface and cloud services management as described herein.

Cloud administrative database 503 is preferably a structured relational database containing various cloud management data structures 504 for maintaining cloud state, identifying clients, tracking usage, and so forth, and a cloud administrative database manager 505 for managing and accessing the data structures 504. In the preferred embodiment, data structures 504 include a physical machines table 510, a virtual machines table 511, a clients table 512, and one or more usage tables 513, and may contain additional tables (not shown). As is known in the database art, a database table is a data structure logically in the form of a table having multiple records (also called entries or tuples), each record having at least one, and usually multiple, fields (also called attributes). Although tables 510-513 are data structures which are logically equivalent to tables, they may be arranged in any suitable structure known in the database art. Associated with the database tables are one or more auxiliary data structures 515-517, also sometimes referred to as metadata (of which three are represented in FIG. 5, it being understood that the number of such structures may vary). Auxiliary data structures characterize the structure of the database and data therein, and are useful in various tasks involved in database management, particularly in executing queries against the database. Examples of auxiliary data structures include database indexes, materialized query tables, histograms, index advice record, and so forth, it being understood that other types of metadata may exist.

Figure 6:
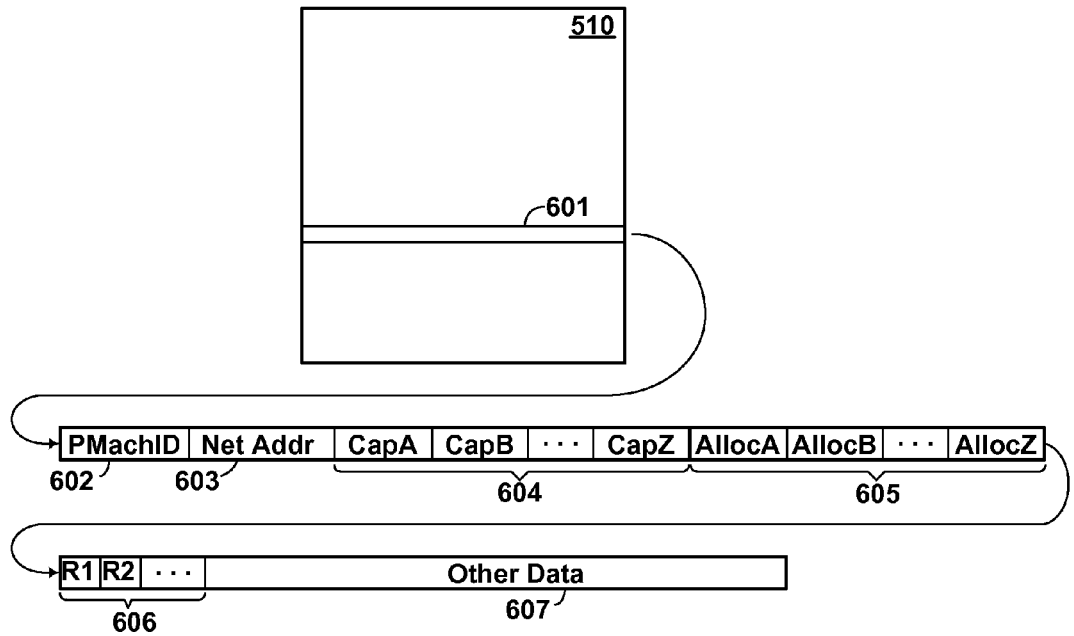
FIG. 6 is a conceptual illustration of a physical machines table in a cloud administrative database, according to the preferred embodiment.

Physical machines table 510 is used to record the parameters of the application servers 203 (i.e., the physical machines) which perform the actual work on behalf of clients accessing cloud services. Physical machines table 510 contains multiple records, each record corresponding to a respective physical application server computer system 203 which is part of cloud 101. FIG. 6 is a conceptual illustration showing in greater detail physical machines table 510 in cloud management data 504, according to the preferred embodiment. Each record 601 in physical machines table 510 contains a physical machine identifier (ID) 602, a network address 603, one or machine capacities 604, one or more allocated capacities 605, and one or more resource availability flags 606. Physical machine ID 602 is a unique identifier assigned to the corresponding physical machine for use by the various functions of the portal server. This identifier could be arbitrary, or it could be based on network addresses, locations, MAC Ids, or other identifying data. Network address 603 contains address data required to communicate with the corresponding machine. It preferably includes the Internet Protocol (IP address) of the corresponding physical machine, but may include other network data such as a MAC ID, port or other data identifying the machine on a local area network. Machine capacities 604 contains one or more fields specifying a quantitative resource capacity of the corresponding machine. For example, capacities may include a maximum number of virtual machines supported, a number of physical processors, a processing capacity, a memory capacity of main memory, a local storage capacity, a network bandwidth capacity, and so forth. Allocated capacities 605 contains one or more fields specifying an amount of the machine capacities specified in fields 604 which have previously been allocated for use by virtual machines. Resource availability flags contains one or more flags indicating the presence of a corresponding hardware and/or software resource on the physical machine. For example, resource flags might be used to indicate the operating system platform used, whether particular application software has been loaded on the machine, or whether a particular hardware device is installed. The physical machine record 601 may contain any of various other or additional fields 607 useful to identify a physical machine and its attributes. For example, additional fields may include a password or other authenticating data for authenticating the portal server 202 and/or the client 103 to the corresponding application server 203, an encryption method and/or encryption key for encrypting data communications with the corresponding application server, information about ownership of the physical machine and accounting for its use, and so forth.

Figure 7:
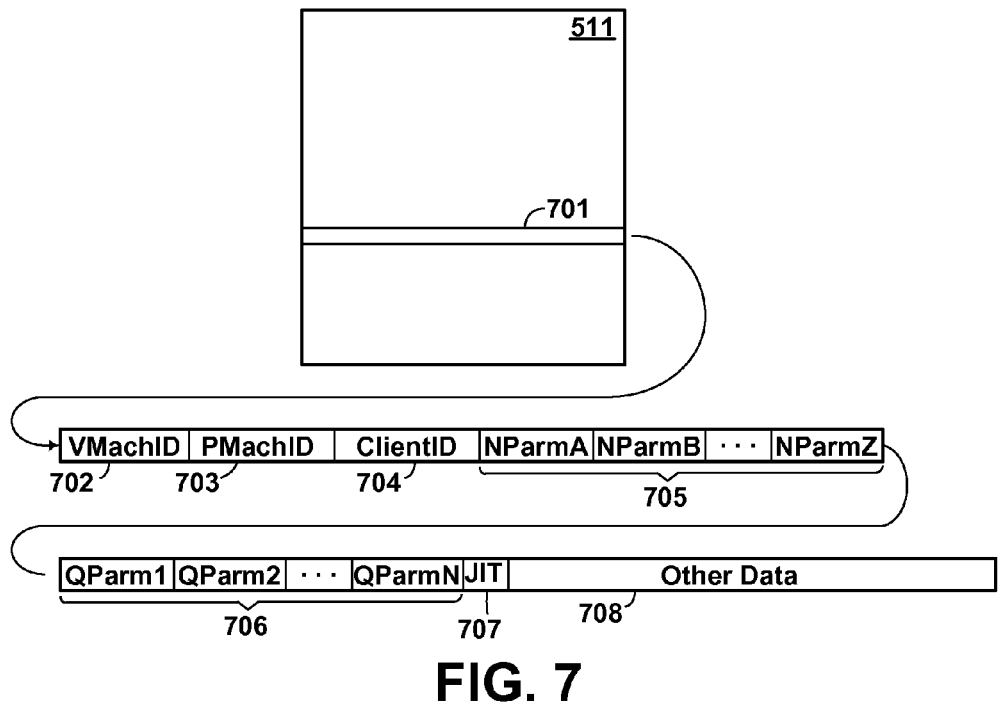
FIG. 7 is a conceptual illustration of a virtual machines table in a cloud administrative database, according to the preferred embodiment.

Virtual machines table 511 is used to record the parameters of a virtual machine which has been allocated for use by a client. In general, each virtual machine is allocated for use by a single client and is executed on a single physical machine, although in one or more alternative embodiments a single virtual machine could be allocated for use by multiple clients. For example, a business may host a web server running on a virtual machine which serves a large number of clients, and for which only some clients have authority to change the virtual machine parameters. Additionally, a single virtual machine could be configured in a high availability manner to straddle multiple physical machines, so that if one physical machine became unavailable (hardware fault, loss of network connection, etc.) the virtual machine could execute on at least one remaining physical machine. Virtual machines table 511 contains multiple records, each record corresponding to a respective virtual machine 102 which is part of cloud 101. FIG. 7 is a conceptual illustration showing in greater detail virtual machines table 511 in cloud management data 504, according to the preferred embodiment. Each record 701 in virtual machines table 511 contains a virtual machine identifier (ID) 702, a physical machine ID 703, a client ID 704, and one or more virtual machine parameters which define the characteristics of the corresponding virtual machine. Virtual machine ID 702 is a unique identifier assigned to the corresponding virtual machine for use by the various functions of the portal server. Physical machine ID 703 identifies the physical machine to which the virtual machine has been assigned for execution, i.e. it is a key field matching the physical machine ID field 602 of the corresponding physical machine in physical machines table 510. Client ID 704 is the identifier of the client on behalf of which the virtual machine is allocated. Where multiple clients use a single virtual machine, other or alternative data structures may be used to record the association of clients to virtual machines. The virtual machine parameters 705 specify the essential defining characteristics of the virtual machine. These may include one or more numerical or quantitative parameters ("NParm") 705, as in the case of processor or memory capacity, and/or one or more qualitative parameters ("QParm") 706, such as specifying an operating system platform or use of software resources, and preferably at least one JIT compiler flag 707 indicating that a corresponding JIT compiler is installed in the virtual machine. The JIT compiler capability may be implied by the operating system configuration, in which case a JIT compiler flag could be optional. The virtual machine record 701 may contain any of various other or additional fields 708 useful to identify a virtual machine and its attributes or perform essential operations. For example, additional fields may include a password or other authenticating data for accessing the virtual machine, a time or creation/allocation or deletion/deallocation, priority of execution, and so forth.

Figure 8:
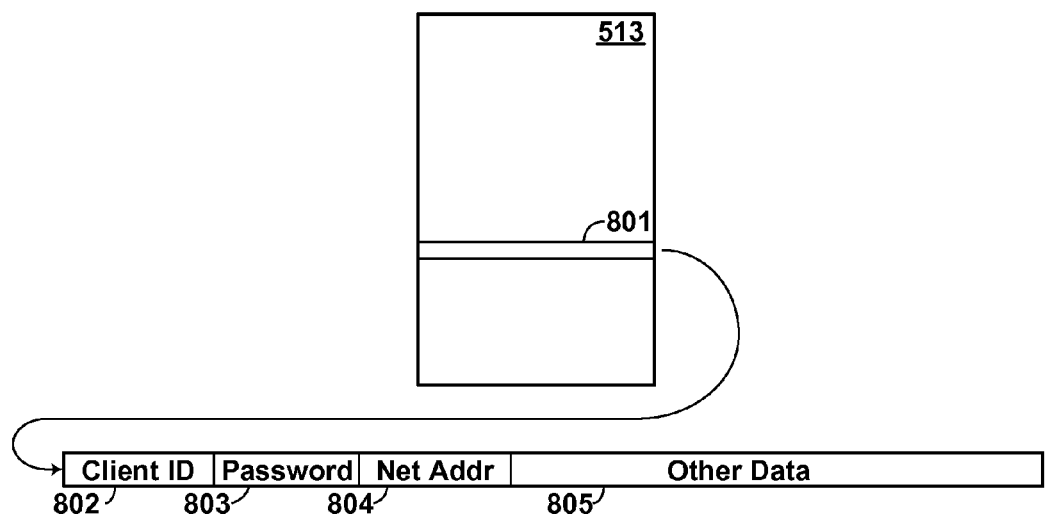
FIG. 8 is a conceptual illustration of a clients table in a cloud administrative database, according to the preferred embodiment.

Clients table 512 contains multiple records, each record corresponding to a respective client 103 in cloud computing environment 100, which is registered with portal 202 to access cloud computing services. FIG. 8 is a conceptual illustration showing in greater detail clients table 512 in cloud management data 504, according to the preferred embodiment. Each record 801 in clients table 512 contains a client identifier (ID) 802, a password or other authenticating data 803 for accessing cloud computing services, and a network address 804 (such as an IP address) for communicating with the client over network 201. The record may contain any of various additional fields 805 useful to identify a client, client's preferences/profile information, billing and accounting information, and so forth. For example, additional fields may include a name of a user (i.e., a natural person) associated with the client, an e-mail address, a street address, a telephone number, preferred methods of contacting the user, methods of payment, account status, and so forth.

Cloud administrative database manager 505 is executable computer programming code which executes on CPU 301 to provide basic functions for the management of database 503. Database manager 520 may theoretically support an arbitrary number of database tables, which may or may not have related information, a specific number and structure of tables being shown in FIG. 5. Database manager 520 preferably contains administrative maintenance functions 506 allowing authorized users to perform basic administrative operations with respect to the database, such as defining and editing database table definitions, creating, editing and removing records in the database, viewing records in the database, defining database auxiliary data structures such as indexes and materialized query tables, and so forth. Certain of these functions may be available only to system administrators and the like, while others are available to clients. Database manager 520 preferably further includes a query engine 507 for executing queries against data in database tables 510-514. Database manager 520 further preferably includes an external interface 508 having one or more application programming interfaces (APIs) by which external applications can access cloud management data 504 either by invoking query engine 507 or through other means. Database manager 520 may further contain any of various more advanced database functions, as are known in the art. Database manager could be a generic database management system, such as one implementing a structured query language (SQL) query protocol, but it might alternatively query and structure data according to some other protocol and/or that it might be a custom designed database management system. Although database manager 520 is represented in FIG. 5 as an entity separate from operating system kernel 501, it will be understood that in some computer architectures various database management functions are integrated with the operating system.

Although one database 503 having five database tables 510-514 and three auxiliary structures 515-517 are shown in FIG. 5, the number of such entities may vary, and could be much larger. Additionally, database 503 may be logically part of a larger distributed database which is stored on multiple computer systems. Although cloud administrative database manager 505 is represented in FIG. 5 as part of database 503, the administrative database manager, being executable code, is sometimes considered an entity separate from the "database", i.e., the data.

Memory 302 of a computer system 300 configured as a portal server 202 further includes administrative console application 520. Administrative console 520 is a set of computer programs or functions (i.e., executable computer programming code which execute on CPU 301) providing basic functions for the operation and maintenance of multiple virtual machines 102 in the cloud, which perform computing services on behalf of clients 103. In particular, the administrative console includes a web client interface function 521, an application server interface function 522, a virtual machine allocation/deallocation function 523, an optional load balancing function 524, and client registration and accounting function 525.

Web client interface function 521 maintains a web presence accessible remotely by clients 103 over the Internet. I.e., establishes a session with a web browser application executing in a client, generates and transmits one or more web pages to the client, and receives interactive input from the client to make administrative console services available to the client. In an alternative embodiment, interface function 521 may be an API to a remote program in the client (other than the browser).

Application server interface function 522 provides an interface for communicating with one or more application servers 202, and specifically for communicating information required for configuring virtual machines in the application servers to perform useful work on behalf of clients. Application server interface may communicates with low level hypervisor functions in the application server. It may communicate with a different physical server machine over network 201, or, in the case where the portal server is itself virtual machine executing in one of the servers, it may communicate with low level hypervisor functions in the same physical machine.

Virtual machine allocation/deallocation function 523 allocates, deallocates and changes the parameters of virtual machines 102 in the cloud, accessing cloud management database 504 to obtain data necessary for selecting a physical machine on which to allocate a requested virtual machine, updating cloud management data to reflect allocations/deallocations/changes, and so forth.

Optional load balancing function 524 provides the capability to shift load from one physical application server 202 to another by migrating one or more virtual machines to a different physical machine. Typically, load balancing among different physical application servers supporting cloud computing services is accomplished by spreading the load as virtual machines are allocated to requesting clients. E.g., priority in allocation is given to physical machines with lighter loads. Notwithstanding such practices during allocation, it is possible that loads will become unbalanced due to long running virtual machines which consume significant resources, and in this case it may be desirable to migrate a previously allocated virtual machine to another server. Such migration involves some overhead, since virtual machine state must be migrated intact, but in some cloud environments it may be possible to do so.

Client registration and accounting function 525 is used for initially registering clients for use of cloud services, verifying that the client is authorized to access a requested service, tracking usage for billing purposes, and so forth.

In addition to administrative console 520, one or more cloud management applications (not shown) may access data in database 503 to perform tasks on behalf of system administrators and the like, and may use defined APIs to do so. Such user applications may execute on portal server 203, or may access the cloud administrative database from remote systems. Such cloud management applications may include, e.g., accounting applications which allocate charges for services provided; audit and security applications which monitor events and accesses; administrative applications which update software, diagnose and repair faults, and otherwise maintain the portal server; or any of various other applications which may have use for the data.

Figure 9:
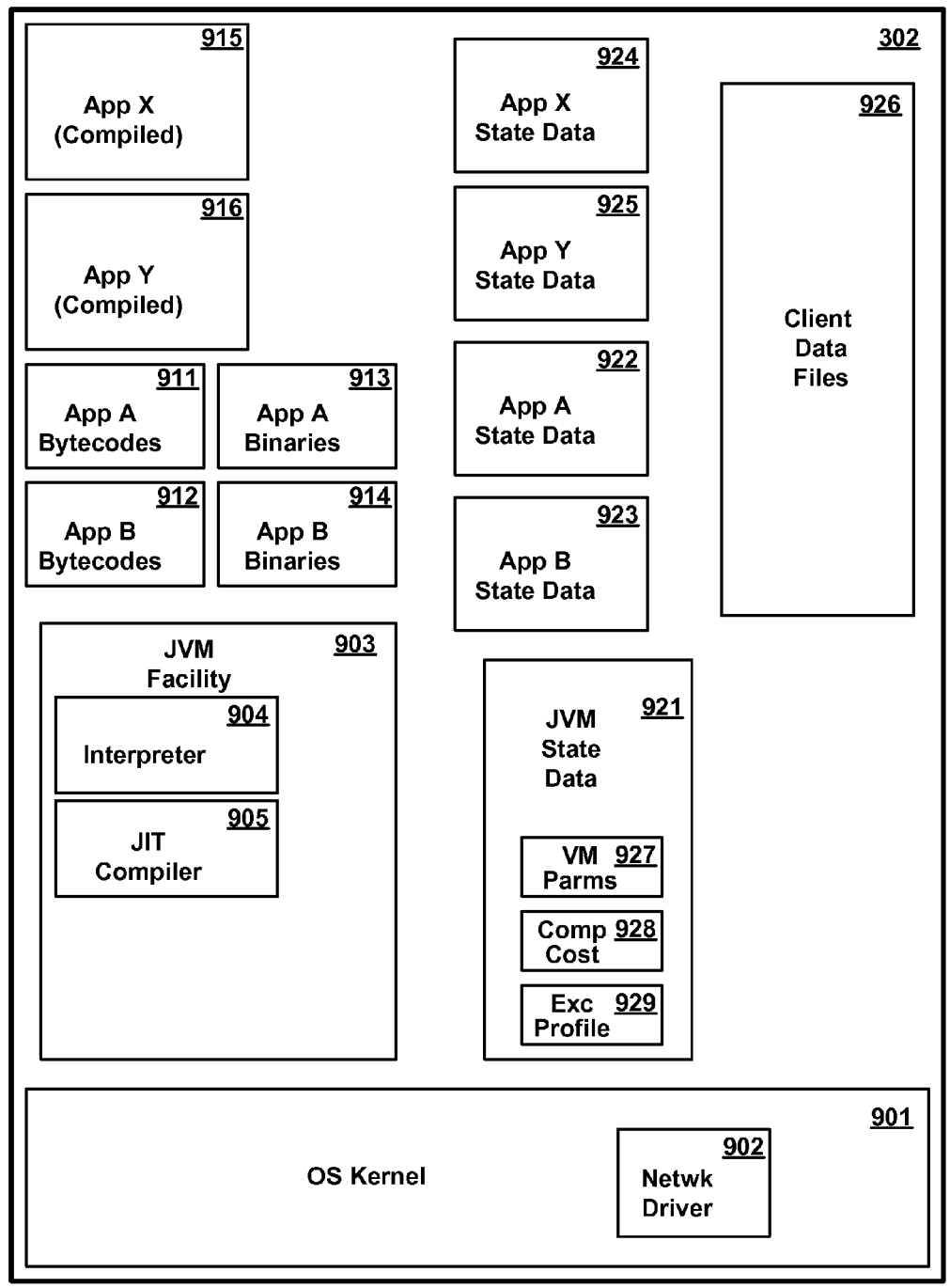
FIG. 9 is a conceptual illustration of the major software components of a client virtual machine within an application server, according to the preferred embodiment.

FIG. 9 is a conceptual illustration of the major software components of a client virtual machine within an application server 203, according to the preferred embodiment, i.e. within a computer system 300 in memory 302, configured to provide the function of an application server 203. In the preferred embodiment, the software components illustrated in FIG. 9 occupy a single partition (virtual machine) of a physical computer system 300 supporting multiple virtual machines. Operating system kernel 901 is executable code and state data providing various low-level software functions, such as device interfaces, management of memory pages, management and dispatching of multiple tasks, etc. as is well-known in the art. In particular, OS kernel 901 includes one or more network adapter drivers 902 for handling communications with network 201 via network adapters 314.

JAVA Virtual Machine (JVM) facility 903 is a software facility supporting the execution of JAVA compliant programming code. I.e., JVM facility 903 is a set of executable instructions, state variables, and so forth, generally above the level of OS kernel 901 and below the level of most application programming code, which allows computer system 100 to properly execute any program in JAVA bytecode form, and thus function as a JAVA Virtual Machine. JVM facility 903 includes specifically JAVA interpreter 904 and JAVA Just-in-Time (JIT) compiler 905, as more fully described herein. The JAVA Virtual Machine facility, although containing the term "virtual machine" and embodying certain characteristics of a virtual machine, is not to be confused with a client virtual machine 404-407, in which the JVM executes. Although JVM facility 903 is shown separate from OS Kernel 901 in the representation of FIG. 9, it will be appreciated that a JVM facility could be integrated with the operating system.

Application bytecodes 911-912 represent files containing application program code in JAVA bytecode form. A bytecode file 911-912 might be a stand-alone program, or might be some set of objects and methods which are included in other programs. When a program in JAVA bytecode form is invoked for execution, JVM facility 903 "executes" the program by interpretation and/or JIT compilation, as described more fully herein. The word "executes" is in quotes because the bytecode is not directly machine executable, and therefore requires some form of translation to executable in order to execute, a function which is performed by the JVM facility. However, from the user's perspective, a program in JAVA bytecode form appears to execute on a machine having a JVM facility.

During execution, the JVM facility may compile, with the JIT compiler, all or part of the bytecode files to executable ("binary") code, thereby creating application binary files 913-914. Execution from compiled executable code is generally more efficient than interpreted execution of the bytecodes, but there is naturally an overhead penalty involved in compilation.

In addition to application programs A and B, represented as JAVA bytecode files 911-912 and compiled executable binary code files 913-914 derived therefrom, the client virtual machine may contain statically compiled applications 915-916, represented as applications X and Y. Statically compiled applications run independently of the JVM facility.

Executing applications generate respective program state data 922-925 during execution, such as a program stack, heap, and so forth, which maintain program state and are manipulated by the application program during execution. Executing application programs may access data in one or more external client data files, represented at a high level as feature 926.

Additionally, to support execution, JVM facility 903 creates certain temporary JVM state data objects 921 in memory. JVM state data 921 is data used by JVM facility 903 to govern the operation of the JVM facility, including interpreter 904 and JIT compiler 905. Among the state data maintained by the JVM is a virtual machine parameter record 927, a compilation cost record 928, and execution profile data 929. The virtual machine parameter record 927 contains the defining parameters of the client virtual machine associated with one or more binary code modules 913-914 compiled by the JVM compiler, i.e., the parameter record identifies the applicable client virtual machine parameters that were in effect at the time the associated binary code module was compiled by the JVM compiler. There could be multiple different configurations of virtual machine parameters recorded if different code modules were compiled under different configurations. The compilation cost record 928 contains one or more measures of "cost", i.e. execution time and/or other measure of resources consumed in compiling each of the various modules compiled by the JIT compiler. Execution profile data 929 is data expressing previous code execution patterns, such as the frequency of execution and or typical execution time and/or other measure of resources consumed of each of the various code modules. This information could be structured in any appropriate form.

Although a JVM facility and its JIT compiler are described herein as a preferred or exemplary embodiment, it will be understood that the present invention is not limited to use in a JAVA JIT compiler, and that other just-in-time or dynamic compilers could alternatively be used.

Various software entities are represented in FIGS. 5 and 9 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representations of FIGS. 5 and 9, it will be understood that the actual number of such entities may vary, and in particular, that in a complex cloud computing environment, the number and complexity of such entities is typically much larger. Additionally, although software components of portal server 203 are depicted in FIG. 5 on a single computer system 300 (or virtual machine partition within a single physical computer system) for completeness of the representation, it is not necessarily true that all programs, functions and data will be present on a single computer system or will be performed on a single computer system. For example, accounting, billing and usage data might be maintained on a different system from that which manages allocates, deallocation, and changes to virtual machines.

While the software components of FIGS. 5 and 9 are shown conceptually as residing in memory 302, it will be understood that in general the memory of a computer system will be too small to hold all programs and data simultaneously, and that information is typically stored in data storage devices 325-327, comprising one or more mass storage devices such as rotating magnetic disk drives, and that the information is paged into memory by the operating system kernel 501 or 901 as required. In particular, database tables 510-517 are typically too large to be completely loaded into memory, and typically only a portion of the total number of database records is loaded into memory at any one time. The full database 503 is typically recorded in disk storage 325-327. Furthermore, it will be understood that the conceptual representation of FIGS. 5 and 9 is not meant to imply any particular memory organizational model, and that system 300 might employ a single address space virtual memory, or might employ multiple virtual address spaces which overlap.

In the preferred embodiment, a client 103 requesting cloud computing services communicates in the first instance with portal server 202, which maintains the administrative console application. The administrative console application manages the requested work, assigning it as necessary to application servers 203 for execution. The administrative console is itself an application which the client remotely accesses, and therefore functions as a form of server acting on behalf of the clients. Among other things, the administrative console maintains a record of the work assignments made and requested work parameters received from the clients.

In general, each item of requested work is assigned to a respective single one of servers 203 for execution, and for clarity of description herein a single respective server 203 will be described. However, it may be possible in some cloud computing environments to perform certain large computing tasks in parallel using multiple servers 203. Thus, each virtual machine 102 in fact executes on a single respective server 203, although each server 203 may, and usually will, support multiple virtual machines. The requesting client specifies the parameters of a virtual machine it requires to perform useful work. Such a virtual machine may be specified as a combination of hardware and/or software. For example, the client may specify an amount of processor, memory, storage capacity, and/or network bandwidth capacity. The client may further specify an operating system platform and/or one or more application programs to be executed. Other or additional parameters may be specified.

The administrative console application selects the server 203 to perform the requested work as a virtual machine based on the parameters of the virtual machine specified by the client. For example, the selected server should have adequate processor, memory and storage capacity, taking into account the capacities already consumed by any virtual machines already supported by the selected server. Additionally, a selected server may be required to support a particular type of hardware/software platform, such as a particular operating system. The selection of a server 203 may be based on additional criteria, such as balancing of load among the various application servers 203, whether needed application programs or data are already loaded to the selected server, and so forth.

Once the requested work (virtual machine) is assigned to a particular application server 203, the administrative console so notifies the selected server directly (i.e., without intervention by the client), providing the parameters of the requested virtual machine The selected server allocates necessary internal data structures to support execution of a virtual machine having the parameters requested by the client. One or more applications executing in the virtual machine then perform the requested work on behalf of the client and return results. Specifically, performing the requested work could include executing one or more applications using a JIT or dynamic compiler, such as a JAVA JIT compiler. Preferably, once a virtual machine is established in the selected application server, the administrative console hands off network communication to the selected application server (e.g., by providing the network addresses, such as the Internet Protocol (IP) addresses, of the client), to enable the selected application server to communicate directly with the client, without passing communications through portal server 202. However, it would alternatively be possible to pass all communications through the portal server.

A client 103 may from time to time change the virtual machine parameters of a virtual machine in the cloud environment associated with the client by remotely accessing the administrative console. This is preferably done through a web-based interactive interface. When the client changes the parameters, the administrative console automatically notifies the application server 203 in which the corresponding virtual machine is executing of the parameter changes. The hypervisor in the application server records and enforces these changes to the virtual machine. Furthermore, notification is provided to the JVM facility 903 within the client's within the client's virtual machine, which takes action to selectively recompile dynamically compiled code to execute more efficiently under the altered virtual machine parameters, as described in greater detail herein.

Figure 10A:
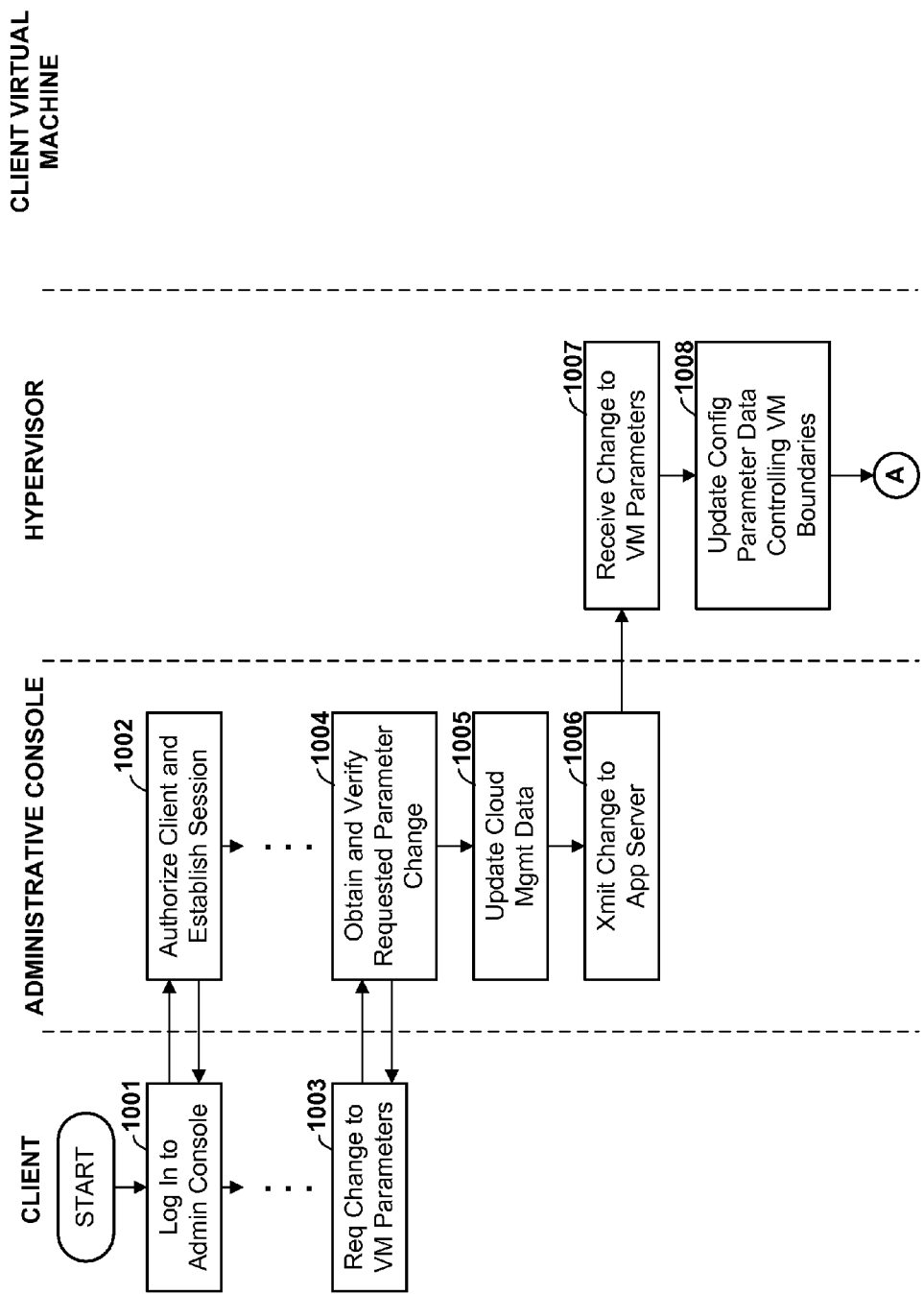

FIG. 10 is a flow diagram illustrating at a high level the process of changing the defining parameters of a client's virtual machine 102 executing in the cloud, i.e. executing in an application server 202 which provides cloud services, according to the preferred embodiment. This process involves interaction among the client 103, the administrative console application 520 executing in the portal server 202, the hypervisor executing in the application server 203, and the client virtual machine in the application server. Actions performed by each of these entities are depicted in the respective columns of FIG. 10, separated by vertical broken lines.

Referring to FIG. 10, a previously registered client 103 transmits a login request to the cloud administrative website maintained by administrative console application 520 in portal server 202 (block 1001). The administrative console interacts with the client to verify the client's identity (e.g., by obtaining a password or the like) and establishes a session with the client (block 1002)

Either immediately after logging in, or after performing one or more intermediate operations, the client at some point initiates a request to change one or more defining parameters of a virtual machine assigned to the client (block 1003). This request is again directed to the administrative console, and the console presents one or more interactive web pages to the client to obtain required parameters from the client, verify the requested change, issue warnings or other information deemed desirable, and so forth (block 1004). When all required input from the client has been obtained and verified, the administrative console updates the cloud management data record to reflect the change (block 1005). Updating records includes updating the corresponding entry for the client's virtual machine in virtual machines table 511 and changing appropriate allocated amounts in the entry physical machines table 510 corresponding to the physical application server 203 on which the client's virtual machine executes. This could require changing other data as well.

The administrative console application 520 further transmits a message to the hypervisor 403 within the physical application server on which the client's virtual machine executes, directing the hypervisor to alter the parameters of the client's virtual machine (block 1006). The hypervisor receives the message (block 1007), and responsive thereto the hypervisor's dynamic configuration utility 408 alters configuration parameter data which governs the boundaries of the client's virtual machine (block 1008). As explained previously, non-dispatchable hypervisor 402 is low level privileged code which enforces virtual machine partition boundaries. The boundaries themselves are expressed in data, which may be stored in configuration records accessible only to the hypervisor, but may also in some cases be loaded into special purpose hardware registers which are used to prevent a virtual machine from exceeding its allocated resources. The exact configuration of this data, including hardware registers, is machine specific. Block 1008 is intended to represent any and all operations necessary to re-configure the parameters of the virtual machine being changed.

The hypervisor then notifies the OS kernel 901 within the virtual machine being changed that a change in its defining parameters has taken place (block 1009). This could be accomplished, for example, by generating a specially defined event interrupt. The OS Kernel detects the notification (block 1010), and in response, triggers an alert to the JVM 903 (block 1011). JVM 903 responds by setting a respective recompile flag (RC flag) for every code module in a currently active, executing process instance which has already been compiled by the JIT compiler 905, i.e., has been compiled and optimized to the previous virtual machine parameters (block 1012). If the client had so specified when requesting the virtual machine change at blocks 1003, 1004, the JVM can also set a recompile forced flag (RCF flag) for every such code module. The RC flag and RCF flag trigger certain recompilation actions as explained in greater detail with respect to FIG. 11 herein.

In addition to notifying the OS kernel of the change, the hypervisor returns an acknowledgment that the change has been effected to the administrative console (block 1013). The administrative console receives the acknowledgment (block 1014), and transmits its own acknowledgment of the change back to the client (block 1015). The client receives the acknowledgment and present the information to the user of the client machine, e.g., by display on an interactive display (block 1016). The acknowledgment from the hypervisor represented as blocks 1013-1016 may be optional.

After dynamic configuration utility 408 has made the required changes to the parameter records which define the client's virtual machine, the hypervisor, and in particular the non-dispatchable hypervisor 402, limits resources of the client's virtual machine as specified by the revised defining parameters (block 1017), effectively changing the configuration of the client's virtual machine. For example, if the client specified a change in the virtual machine's available memory, the hypervisor thereafter uses the new memory limit as the applicable limit of physical memory in the application server's hardware which can by allocated to the client's virtual machine.

Figure 11:
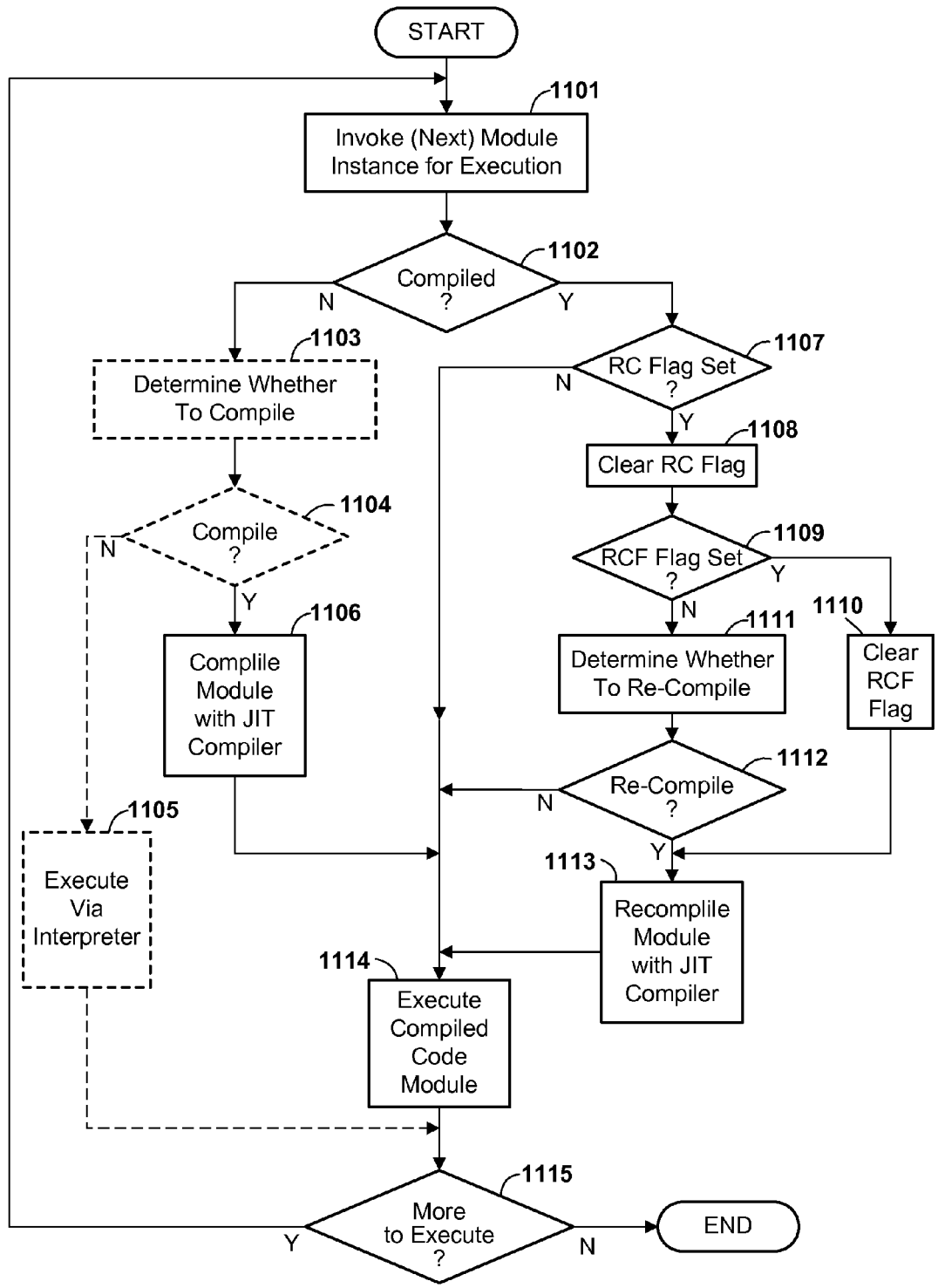
FIG. 11 is a flow diagram illustrating at a high level the operation of a various functions in a client virtual machine supporting execution of one or more dynamically compiled code modules, according to the preferred embodiment.

FIG. 11 is a flow diagram illustrating at a high level the operation of a various functions in a client virtual machine 404-407 supporting execution of one or more dynamically compiled code modules, according to the preferred embodiment. In this embodiment, JVM facility 903 supports the execution of JAVA bytecode modules using a JAVA JIT compiler 905 and JAVA interpreter 904. It will be understood that alternative dynamic compilers could be used, that in an alternative environments all code could be dynamically compiled and executed without the use of an interpreter, and that the dynamic compiler could compile code directly from source, i.e., without an intermediate code module such as a JAVA bytecode module.

Referring to FIG. 11, an execution instance of a code module (which could be a stand-alone program, or a procedure, method or other portion thereof) is invoked for execution (block 1101). Block 1101 could represent invocation of a root code module, e.g., a module invoked by command of the client, or could represent a module invoked as a result of execution of another code module or another execution instance of the same code module. Invoking a root module typically requires allocation of a program stack and other appropriate data structures in memory; an execution instance of other than a root module typically requires adding an entry to an existing program stack.

The JVM determines whether the invoked code module has previously been compiled (block 1102). If not (the 'N' branch from block 1102), the JVM optionally makes an automated determination whether or not to compile the corresponding bytecode module to executable ("binary") code (block 1103). This determination typically involves consideration of the execution frequency of the invoked module, which is information the JVM may have available from profiling previous execution of the same program and/or by counting the number of times the module is invoked in current execution instance of the program. If the JVM determines not to compile (the 'N' branch from block 1104), the invoked module is executed by interpreter 904 from its bytecode form (block 1105). If the JVM determines to compile the invoked module (the 'Y' branch from block 1104), the module is then compiled using JIT compiler 905 (block 1106). The compiled version of the module is then executed directly, without use of the interpreter (block 1114). Blocks 1103, 1104 and 1105 are shown in FIG. 11 as dashed lines because the determination whether to compile is optional, and in some environments the JVM may automatically compile all uncompiled modules.

If, at block 1102, the invoked module has already been compiled by the JIT compiler, the 'Y' branch is taken. The JVM then determines whether the recompile flag (RC flag) for the invoked module is set (block 1107). In the preferred embodiment, the RC flag is used to indicate that the JVM should make a determination whether to recompile. Certain events cause the RC flag to be set. In particular, in accordance with the preferred embodiment, the RC flag is set when there is a configuration change to the parameters of the client virtual machine in which the JVM is executing, including changes made by the client through the administrative console application 520 executing in the portal server 202. In additional embodiments, other events could cause the RC flag to be set. For example, the RC flag could be set when there has been a maintenance upgrade to the bytecode module itself, or to the OS kernel 901, or the JVM 903. Additionally, the flag might be set if a sufficient length of time has elapsed since it was last compiled, on the assumption that cumulative small changes and/or accumulated profiling data might justify re-compilation. If the RC flag is not set, the 'N' branch is take from block 1107, and the previously compiled module is executed (block 1114).

If the RC flag is set (the 'Y' branch from block 1107), the RC flag is cleared (block 1108). Clearing the RC flag avoid having to again make a determination (which can involve some overhead) whether to recompile if the same code module is again invoked in the near future. If the RCF (recompile forced) flag is set ('Y' branch from block 1109), the RCF flag is cleared (block 1110), and the module is recompiled with the JIT compiler (block 1113). The RCF flag is used to force recompilation in certain circumstances, and thus by-pass an automated selective determination whether to recompile. In the preferred embodiment, the client may optionally specify forced recompilation when specifying a change to the virtual machine parameters in the administrative console interface, causing the RCF flag to be set. Other circumstances might cause the RCF flag to be set, for example, if the code module was updated to correct a defect. If the RCF flag is not set (the 'N' branch from block 1109), the JVM then automatically makes a determination whether to recompile (block 1111). Recompilation at block 1113 is indeed a compilation again of a code module which has been previously compiled by the JIT compiler during the current execution of the program, and is therefore available for execution of the code module in the processor. Since a compiled copy already exists, it would not normally be recompiled by the JIT compiler, and is being recompiled in the circumstances described herein in order to optimize the code to the current virtual machine parameters.

The decision whether to recompile involves a cost-benefit analysis, i.e. a comparison of the cost of compilation with the predicted benefit. The cost can be projected with some accuracy by simply saving one or more appropriate measures of resources consumed from the previous compilation of the same module. Such data is preferably saved as compilation cost record 928. The potential benefit is more difficult to predict, but with the use of execution profiling data 929 indicating some measure of expected frequency of execution of the module and resource consumed during each invocation, an approximation of the scope of predicted execution cost can be made. The final element of this prediction is a function of the difference between the current virtual machine parameters and the virtual machine parameters under which the previous compilation was performed (the latter being stored in virtual machine parameter data 927). Simply put, the greater the change in the virtual machine parameters, the greater the expected impact on performance from re-compilation. Such a function is not necessarily linear, and in general a reduction in the size of a virtual machine is likely to have a more significant performance impact that an increase. For example, a significant reduction in virtual machine memory could cause excessive paging of data into and out of memory (a condition known as thrashing) if too many threads are active at any one time; a recompilation limiting the number of threads spawned may reduce this problem.

It would therefore be possible to derive a recompilation figure of merit (R) for determining whether to recompile as:

$$R = \text{Freq}_{EX} * \text{Cost}_{EX} * F(\Delta \text{VMParameters}) - \text{Cost}_{COMP}$$

where $\text{Freq}_{EX}$ is the predicted execution frequency of the module, $\text{Cost}_{EX}$ is the predicted cost of executing the module once, $F(\Delta \text{VMParameters})$ is a function expressing the impact of the change in virtual machine parameters, and $\text{Cost}_{COMP}$ is the predicted cost of recompilation. Such a figure of merit could be used as the basis of the decision whether to recompile. Of course, any of various alternative techniques and/or formulae could be used. For example, the decision could be rule-based, in which recompilation would be triggered if any of various threshold conditions were met, such as reduction or increase of a specific virtual machine parameter by at least a certain amount.

If the JVM determines that recompilation should be performed, the 'Y' branch is taken from block 1112, and the module, which was previously compiled, is recompiled with the JIT compiler, using the current virtual machine parameters for optimizing the compiled code (block 1113). The optimized code produced by the JIT compiler is dependent at least in part on the virtual machine parameters, meaning different parameters might cause different optimized code to be produced. E.g., the number of threads which are spawned, the determination to perform operations serially or in parallel, allocation of stack and heap space, and so forth, might all be affected by the current virtual machine parameters. The compiled code module is then executed (block 1114). If the JVM determines not to recompile (the 'N' branch from block 1112), recompilation at block 1113 is by-passed, and the previously compiled code is executed at block 1114.

If another execution instance of a module is invoked, which could be another execution instance of the same module (the 'Y' branch from block 1115), blocks 1101-1114 are repeated. When all execution instances complete, the JVM process ends (the 'N' branch from block 1115). Although this process is represented in FIG. 11 as a serial process for ease of understanding, it will be understood that the JVM could spawn multiple threads executing simultaneously, i.e., "execution" represented by blocks 1105 and 1114 could be occurring concurrently in multiple different module instances and a next module could be invoked for execution at block 1101 while previously invoked modules are still executing.

Although a series of steps has been described above as a preferred embodiment, it will be appreciated that many variations of processes for accessing cloud services, altering parameters of client virtual machines in the cloud, and adjusting the performance of dynamically compiled code in response. In particular, some steps may be performed in a different order, different data structures may be used, and/or different hardware or software resources may be employed to perform functions described herein.

In the preferred embodiment described above, the cloud administrative data takes the form of records in a relational database which are accessed using general-purpose database search tools. However, in general cloud administrative data might be anything which records the information necessary to make an manage resources in the cloud, and need not be records in a relational database. For example, physical machine records and/or client records and/or virtual machine records might be nothing more than one or more lists. Furthermore, the virtual machine records might be merged with the client records, particularly if a client is permitted to have only a single virtual machine. Other data structures would alternatively be possible.

In general, the routines executed to implement the illustrated embodiments of the invention, whether implemented as part of an operating system or a specific application, program, object, module or sequence of instructions, including a module within a special device such as a service processor, are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product embodied in non-transitory computer-readable media, and the invention applies equally regardless of the form of distribution. Examples of non-transitory computer-readable media include, but are not limited to, volatile and non-volatile memory devices, floppy disks, hard-disk drives, CD-ROM's, DVD's, and magnetic tape, it being understood that these examples are not exhaustive. Examples of non-transitory computer-readable media are illustrated in FIG. 3 as system memory 302 and data storage devices 325-327.

Unless inconsistent with the invention or otherwise qualified herein, computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute as a stand-alone software package or in conjunction with other program code, and may execute entirely on a single machine or on multiple computers connected in a distributed fashion. Multiple computers may be connected to one another through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the non-transitory computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A computer program product, comprising:
   a non-transitory computer-readable media upon which are recorded a plurality of computer-executable instructions, wherein said instructions, when executed by at least one computer system, cause the computer system to perform:
      receiving a notification that a set of defining parameters of a first virtual machine in a cloud computing environment have been altered, said cloud computing environment supporting the execution of a plurality of virtual machines on behalf of a plurality of clients;
      wherein said first virtual machine includes a just-in-time compiler supporting execution of at least one application on said first virtual machine, said just-in-time complier generating executable code for execution on said first virtual machine, said executable code generated by said just-in-time compiler being optimized according to the set of defining parameters of said first virtual machine;

responsive to receiving the notification that the set of defining parameters of said first virtual machine have been altered, causing at least one module of an application executing in said first virtual machine which was previously compiled to executable code by said just-in-time compiler to be recompiled to executable code by said just-in-time compiler, wherein the recompilation comprises:

with respect to each of a plurality of code modules of said application executing in said first virtual machine which were previously compiled by said just-in-time compiler, making a selective determination whether to recompile the respective code module, wherein each said selective determination is based at least in part on an amount of difference of at least one parameter of said set of defining parameters between an original value of the at least one parameter and an altered value of the at least one parameter; and recompiling the respective code module according to a result of said selective determination, the executable code generated by recompilation being optimized according to the set of defining parameters of the altered first virtual machine.

2. The computer program product of claim 1, wherein each said respective selective determination is based at least in part on at least one of: a predicted execution frequency of the respective code module, a predicted cost of executing the respective code module, and a predicted cost of recompiling the respective code module.

3. The computer program product of claim 1, wherein each said respective selective determination is made when the respective code module of the plurality of code modules of said application executing in said first virtual machine which were previously compiled by said just-in-time compiler is first invoked for execution after the receiving the notification that a set of defining parameters of said first virtual machine has been altered.

4. The computer program product of claim 1, wherein said set of defining parameters of said first virtual machine includes at least one parameter from the set of parameters consisting of: a processor capacity, a memory capacity, a storage capacity, and a network bandwidth capacity.

5. A server computer system, comprising:
a memory;
at least one processor executing instructions storable in said memory;
a hypervisor embodied as instructions storable in said memory and executable on said at least one processor, said hypervisor supporting execution of a plurality of virtual machines in said server computer system on behalf of respective clients, each virtual machine of said plurality of virtual machines having a respective set of defining parameters;
a just-in-time compiler embodied as instructions storable in said memory and executable on said at least one processor, said just-in-time compiler supporting execution of at least one applications on a first virtual machine of said plurality of virtual machines, said just-in-time compiler generating executable code for execution on said first virtual machine and said just-in-time compiler is included in each of the plurality of virtual machines, said executable code generated by said just-in-time compiler being optimized according to the set of defining parameters of said first virtual machine;

a code module update mechanism which, responsive to receiving a notification that the set of defining parameters of said first virtual machine has been altered, causes at least one code module of an application executing in said first virtual machine which was previously compiled to executable code by said just-in-time compiler to be recompiled to executable code by said just-in-time compiler, wherein said code module update mechanism causes the at least one code module of an application executing in said first virtual machine which was previously compiled to executable code by said just-in-time compiler to be recompiled to executable code by said just-in-time compiler by:

with respect to each of a plurality of code modules of said application executing in said first virtual machine which were previously compiled by said just-in-time compiler, making a selective determination whether to recompile the respective code module, wherein each said selective determination is based at least in part on an amount of difference of at least one parameter of said of defining parameters between an original value of the at least one parameter and the altered value of the at least one parameter; and recompiling the respective code module according to a result of said selective determination, the executable code generated by recompilation being optimized according to the set of defining parameters of the altered first virtual machine.

6. The server computer system of claim 5, wherein said hypervisor includes a dynamic configuration utility which
receives configuration alteration messages from an external cloud administrative console application, each configuration alteration message directing the hypervisor to alter one or more defining parameters of the set of defining parameters of a respective virtual machine in said server computer system; and
responsive to receiving a message from the external cloud administrative console application directing the hypervisor to alter the one or more defining parameters of the set of defining parameters of the first virtual machine, alters the one or more defining parameters of the first virtual machine as directed by the message, and generates the notification of the alteration of the one or more defining parameters of the first virtual machine to said code module update mechanism.

7. The server computer system of claim 5, wherein each said respective selective determination is based at least in part on at least one of: a predicted execution frequency of the respective code module, a predicted cost of executing the respective code module, and a predicted cost of recompiling the respective code module.

8. The server computer system of claim 5, wherein each said respective selective determination is made when the respective code module of the plurality of code modules of said application executing in said first virtual machine which were previously compiled by said just-in-time compiler is first invoked for execution after the receiving the notification that the set of defining parameters of said first virtual machine has been altered.

9. The server computer system of claim 5, wherein said set of defining parameters of said first virtual machine includes at least one parameter from the set of parameters consisting of: a processor capacity, a memory capacity, a storage capacity, and a network bandwidth capacity.

10. An apparatus for providing a cloud computing service, comprising:

a plurality of server systems, each server system comprising at least one respective processor and a respective memory, each server system supporting a respective plurality of virtual machines for use by clients of said cloud computing service:

an administrative application which allocates a respective virtual machine in a respective server of said plurality of servers to each of a plurality of clients of said cloud computing service, each virtual machine having a respective set of defining parameters, each client communicating with the respective virtual machine over a network;

wherein at least some of said virtual machines each of a respective client of said plurality of clients include a respective just-in-time compiler supporting execution of at least one respective application on the corresponding virtual machine, each said just-in-time compiler generating executable code for execution on the corresponding virtual machine, the executable code generated by each said just-in-time compiler being optimized according to the set of defining parameters of the corresponding virtual machine in which it executes;

wherein each of the at least some of said virtual machines which include a respective just-in-time compiler supporting execution of at least one respective application on the corresponding virtual machine include a respective code module update mechanism which, responsive to receiving a notification that at least one parameters of the set of defining parameters of the corresponding virtual machine has been altered, selectively determines, with respect to each of a plurality of code modules of an application executing in the corresponding virtual machine which were previously compiled to executable code by the respective just-in-time compiler before the at least one parameter of the set of defining parameters of the corresponding virtual machine was altered, whether to recompile the respective code module to executable code, and causes the respective just-in-time compiler to recompile the respective code module responsive to the selective determination and each said selective determination is based at least in part on an amount of difference of at least one parameter of said of defining parameters between an original value of the at least one parameter and the altered value of the at least one parameter, executable code generated by recompilation being optimized according to the set of defining parameters of the altered corresponding virtual machine.

11. The apparatus for providing a cloud computing service of claim 10, further comprising a respective hypervisor executing in each server system of said plurality of server systems, each said hypervisor embodied as instructions storable in memory of the corresponding server system and executable on at least one processor of the corresponding server system, each said hypervisor supporting execution of a respective plurality of virtual machines in the corresponding server computer system on behalf of respective clients, each said hypervisor receiving respective sets of defining parameters for the respective plurality of virtual machines in the corresponding server computer system from said administrative application.

12. The apparatus for providing a cloud computing service of claim 10, wherein each said respective selective determination is based at least in part on at least one of: a predicted execution frequency of the respective code module, a predicted cost of executing the respective code module, and a predicted cost of recompiling the respective code module.

13. The apparatus for providing a cloud computing service of claim 10, wherein each said respective selective determination is made when the respective code mode of the plurality of code modules of the respective application executing in the corresponding virtual machine which were previously compiled by the respective just-in-time compiler is first invoked for execution after the receiving a notification that a set of defining parameters of the corresponding virtual machine has been altered.

14. The apparatus for providing a cloud computing service of claim 10, wherein each respective set of defining parameters of a virtual machine includes at least one parameter from the set of parameters consisting of: a processor capacity, a memory capacity, a storage capacity, and a network bandwidth capacity.

* * * * *